United States Patent
Paik

(10) Patent No.: US 7,096,085 B2
(45) Date of Patent: Aug. 22, 2006

(54) PROCESS CONTROL BY DISTINGUISHING A WHITE NOISE COMPONENT OF A PROCESS VARIANCE

(75) Inventor: Young Jeen Paik, Campbell, CA (US)

(73) Assignee: Applied Materials, Santa Clara, CA (US)

( * ) Notice: Subject to any disclaimer, the term of this patent is extended or adjusted under 35 U.S.C. 154(b) by 166 days.

(21) Appl. No.: 10/856,016

(22) Filed: May 28, 2004

(65) Prior Publication Data

US 2005/0278051 A1    Dec. 15, 2005

(51) Int. Cl.
*G05B 13/00*    (2006.01)
*G06F 19/00*    (2006.01)

(52) U.S. Cl. .................. 700/108; 700/28; 700/109; 702/84

(58) Field of Classification Search ............ 700/28–34, 700/44, 45, 51, 108–110; 702/81, 84, 182–184
See application file for complete search history.

(56) References Cited

U.S. PATENT DOCUMENTS

| | | |
|---|---|---|
| 3,205,485 A | 9/1965 | Noltingk |
| 3,229,198 A | 1/1966 | Libby |
| 3,767,900 A | 10/1973 | Chao et al. |
| 3,920,965 A | 11/1975 | Sohrwardy |
| 4,000,458 A | 12/1976 | Miller et al. |
| 4,207,520 A | 6/1980 | Flora et al. |
| 4,209,744 A | 6/1980 | Gerasimov et al. |
| 4,302,721 A | 11/1981 | Urbanek et al. |
| 4,368,510 A | 1/1983 | Anderson |
| 4,609,870 A | 9/1986 | Lale et al. |
| 4,616,308 A | 10/1986 | Morshedi et al. |

(Continued)

FOREIGN PATENT DOCUMENTS

CA    2050247    8/1991

(Continued)

OTHER PUBLICATIONS

Lin, Kuang-Kuo and Costas J. Spanos. Nov. 1990. "Statistical Equipment Modeling for VLSI Manufacturing: An Application for LPCVD." *IEEE Transactions on Semiconductor Manufacturing*, v. 3, n. 4, pp. 216-229.

(Continued)

*Primary Examiner*—Jayprakash N. Gandhi
(74) *Attorney, Agent, or Firm*—Wilmer Cutler Pickering Hale & Dorr

(57) ABSTRACT

A method, system and medium is provided for enabling improved control systems. An error, or deviation from a target result, is observed for example during manufacture of semiconductor chips. The error within standard deviation is caused by two components: a white noise component and a signal component (such as systematic errors). The white noise component is, e.g., random noise and therefore is relatively non-controllable. The systematic error component, in contrast, may be controlled by changing the control parameters. A ratio between the two components is calculated autoregressively. Based on the ratio and using the observed or measured error, the actual value of the error caused by the systematic component is calculated utilizing an autoregressive stochastic sequence. The actual value of the error is then used in determining when and how to change the control parameters. The autoregressive stochastic sequence addresses the issue of the effects of run-to-run deviations, and provides a mechanism that can extract the white noise component from the statistical process variance in real time. This results in an ability to provide tighter control, for example in feedback and feedforward variations of process control.

34 Claims, 7 Drawing Sheets

U.S. PATENT DOCUMENTS

| | | |
|---|---|---|
| 4,663,703 A | 5/1987 | Axelby et al. |
| 4,698,766 A | 10/1987 | Entwistle et al. |
| 4,750,141 A | 6/1988 | Judell et al. |
| 4,755,753 A | 7/1988 | Chern |
| 4,757,259 A | 7/1988 | Charpentier |
| 4,796,194 A | 1/1989 | Atherton |
| 4,901,218 A | 2/1990 | Cornwell |
| 4,938,600 A | 7/1990 | Into |
| 4,957,605 A | 9/1990 | Hurwitt et al. |
| 4,967,381 A | 10/1990 | Lane et al. |
| 5,089,970 A | 2/1992 | Lee et al. |
| 5,108,570 A | 4/1992 | Wang |
| 5,208,765 A | 5/1993 | Turnbull |
| 5,220,517 A | 6/1993 | Sierk et al. |
| 5,226,118 A | 7/1993 | Baker et al. |
| 5,231,585 A | 7/1993 | Kobayashi et al. |
| 5,236,868 A | 8/1993 | Nulman |
| 5,240,552 A | 8/1993 | Yu et al. |
| 5,260,868 A | 11/1993 | Gupta et al. |
| 5,270,222 A | 12/1993 | Moslehi |
| 5,283,141 A | 2/1994 | Yoon et al. |
| 5,295,242 A | 3/1994 | Mashruwala et al. |
| 5,309,221 A | 5/1994 | Fischer et al. |
| 5,329,463 A | 7/1994 | Sierk et al. |
| 5,338,630 A | 8/1994 | Yoon et al. |
| 5,347,446 A | 9/1994 | Iino et al. |
| 5,367,624 A | 11/1994 | Cooper |
| 5,369,544 A | 11/1994 | Mastrangelo |
| 5,375,064 A | 12/1994 | Bollinger |
| 5,398,336 A | 3/1995 | Tantry et al. |
| 5,402,367 A | 3/1995 | Sullivan et al. |
| 5,408,405 A | 4/1995 | Mozumder et al. |
| 5,410,473 A | 4/1995 | Kaneko et al. |
| 5,420,796 A | 5/1995 | Weling et al. |
| 5,427,878 A | 6/1995 | Corliss |
| 5,444,837 A | 8/1995 | Bomans et al. |
| 5,469,361 A | 11/1995 | Moyne |
| 5,485,082 A | 1/1996 | Wisspeintner et al. |
| 5,490,097 A | 2/1996 | Swenson et al. |
| 5,495,417 A | 2/1996 | Fuduka et al. |
| 5,497,316 A | 3/1996 | Sierk et al. |
| 5,497,381 A | 3/1996 | O'Donoghue et al. |
| 5,503,707 A | 4/1996 | Maung et al. |
| 5,508,947 A | 4/1996 | Sierk et al. |
| 5,511,005 A | 4/1996 | Abbe et al. |
| 5,519,605 A | 5/1996 | Cawlfield |
| 5,525,808 A | 6/1996 | Irie et al. |
| 5,526,293 A | 6/1996 | Mozumder et al. |
| 5,534,289 A | 7/1996 | Bilder et al. |
| 5,541,510 A | 7/1996 | Danielson |
| 5,546,312 A | 8/1996 | Mozumder et al. |
| 5,553,195 A | 9/1996 | Meijer |
| 5,586,039 A | 12/1996 | Hirsch et al. |
| 5,599,423 A | 2/1997 | Parker et al. |
| 5,602,492 A | 2/1997 | Cresswell et al. |
| 5,603,707 A | 2/1997 | Trombetta et al. |
| 5,617,023 A | 4/1997 | Skalski |
| 5,627,083 A | 5/1997 | Tounai |
| 5,629,216 A | 5/1997 | Wijaranakula et al. |
| 5,642,296 A | 6/1997 | Saxena |
| 5,646,870 A | 7/1997 | Krivokapic et al. |
| 5,649,169 A | 7/1997 | Berezin et al. |
| 5,654,903 A | 8/1997 | Reitman et al. |
| 5,655,951 A | 8/1997 | Meikle et al. |
| 5,657,254 A | 8/1997 | Sierk et al. |
| 5,661,669 A | 8/1997 | Mozumder et al. |
| 5,663,797 A | 9/1997 | Sandhu |
| 5,664,987 A | 9/1997 | Renteln |
| 5,665,199 A | 9/1997 | Sahota et al. |
| 5,665,214 A | 9/1997 | Iturralde |
| 5,666,297 A | 9/1997 | Britt et al. |
| 5,667,424 A | 9/1997 | Pan |
| 5,674,787 A | 10/1997 | Zhao et al. |
| 5,694,325 A | 12/1997 | Fukuda et al. |
| 5,695,810 A | 12/1997 | Dubin et al. |
| 5,698,989 A | 12/1997 | Nulman |
| 5,719,495 A | 2/1998 | Moslehi |
| 5,719,796 A | 2/1998 | Chen |
| 5,735,055 A | 4/1998 | Hochbein et al. |
| 5,740,033 A | 4/1998 | Wassick et al. |
| 5,740,429 A | 4/1998 | Wang et al. |
| 5,751,582 A | 5/1998 | Saxena et al. |
| 5,754,297 A | 5/1998 | Nulman |
| 5,761,064 A | 6/1998 | La et al. |
| 5,761,065 A | 6/1998 | Kittler et al. |
| 5,764,543 A | 6/1998 | Kennedy |
| 5,777,901 A | 7/1998 | Berezin et al. |
| 5,787,021 A | 7/1998 | Samaha |
| 5,787,269 A | 7/1998 | Hyodo |
| 5,808,303 A | 9/1998 | Schlagheck et al. |
| 5,812,407 A | 9/1998 | Sato et al. |
| 5,823,854 A | 10/1998 | Chen |
| 5,824,599 A | 10/1998 | Schacham-Diamand et al. |
| 5,825,356 A | 10/1998 | Habib et al. |
| 5,825,913 A | 10/1998 | Rostami et al. |
| 5,828,778 A | 10/1998 | Hagi et al. |
| 5,831,851 A | 11/1998 | Eastburn et al. |
| 5,832,224 A | 11/1998 | Fehskens et al. |
| 5,838,595 A | 11/1998 | Sullivan et al. |
| 5,838,951 A | 11/1998 | Song |
| 5,844,554 A | 12/1998 | Geller et al. |
| 5,857,258 A | 1/1999 | Penzes et al. |
| 5,859,777 A | 1/1999 | Yokoyama et al. |
| 5,859,964 A | 1/1999 | Wang et al. |
| 5,859,975 A | 1/1999 | Brewer et al. |
| 5,862,054 A | 1/1999 | Li |
| 5,863,807 A | 1/1999 | Jang et al. |
| 5,867,389 A | 2/1999 | Hamada et al. |
| 5,870,306 A | 2/1999 | Harada |
| 5,871,805 A | 2/1999 | Lemelson |
| 5,883,437 A | 3/1999 | Maruyama et al. |
| 5,889,991 A | 3/1999 | Consolatti et al. |
| 5,901,313 A | 5/1999 | Wolf et al. |
| 5,903,455 A | 5/1999 | Sharpe, Jr. et al. |
| 5,910,011 A | 6/1999 | Cruse |
| 5,910,846 A | 6/1999 | Sandhu |
| 5,912,678 A | 6/1999 | Saxena et al. |
| 5,916,016 A | 6/1999 | Bothra |
| 5,923,553 A | 7/1999 | Yi |
| 5,926,690 A | 7/1999 | Toprac et al. |
| 5,930,138 A | 7/1999 | Lin et al. |
| 5,940,300 A | 8/1999 | Ozaki |
| 5,943,237 A | 8/1999 | Van Boxem |
| 5,943,550 A | 8/1999 | Fulford, Jr. et al. |
| 5,960,185 A | 9/1999 | Nguyen |
| 5,960,214 A | 9/1999 | Sharpe, Jr. et al. |
| 5,961,369 A | 10/1999 | Bartels et al. |
| 5,963,881 A | 10/1999 | Kahn et al. |
| 5,975,994 A | 11/1999 | Sandhu et al. |
| 5,978,751 A | 11/1999 | Pence et al. |
| 5,982,920 A | 11/1999 | Tobin, Jr. et al. |
| 6,002,989 A | 12/1999 | Shiba et al. |
| 6,012,048 A | 1/2000 | Gustin et al. |
| 6,017,771 A | 1/2000 | Yang et al. |
| 6,036,349 A | 3/2000 | Gombar |
| 6,037,664 A | 3/2000 | Zhao et al. |
| 6,041,263 A | 3/2000 | Boston et al. |
| 6,041,270 A | 3/2000 | Steffan et al. |
| 6,054,379 A | 4/2000 | Yau et al. |
| 6,059,636 A | 5/2000 | Inaba et al. |
| 6,064,759 A | 5/2000 | Buckley et al. |
| 6,072,313 A | 6/2000 | Li et al. |
| 6,074,443 A | 6/2000 | Venkatesh et al. |
| 6,077,412 A | 6/2000 | Ting et al. |

| | | |
|---|---|---|
| 6,078,845 A | 6/2000 | Friedman |
| 6,094,688 A | 7/2000 | Mellen-Garnett et al. |
| 6,096,649 A | 8/2000 | Jang |
| 6,097,887 A | 8/2000 | Hardikar et al. |
| 6,100,195 A | 8/2000 | Chan et al. |
| 6,108,092 A | 8/2000 | Sandhu |
| 6,111,634 A | 8/2000 | Pecen et al. |
| 6,112,130 A | 8/2000 | Fukuda et al. |
| 6,113,462 A | 9/2000 | Yang |
| 6,114,238 A | 9/2000 | Liao |
| 6,127,263 A | 10/2000 | Parikh |
| 6,128,016 A | 10/2000 | Coelho et al. |
| 6,136,163 A | 10/2000 | Cheung et al. |
| 6,141,660 A | 10/2000 | Bach et al. |
| 6,143,646 A | 11/2000 | Wetzel |
| 6,148,099 A | 11/2000 | Lee et al. |
| 6,148,239 A | 11/2000 | Funk et al. |
| 6,148,246 A | 11/2000 | Kawazome |
| 6,150,270 A | 11/2000 | Matsuda et al. |
| 6,157,864 A | 12/2000 | Schwenke et al. |
| 6,159,075 A | 12/2000 | Zhang |
| 6,159,644 A | 12/2000 | Satoh et al. |
| 6,161,054 A | 12/2000 | Rosenthal et al. |
| 6,169,931 B1 | 1/2001 | Runnels |
| 6,172,756 B1 | 1/2001 | Chalmers et al. |
| 6,173,240 B1 | 1/2001 | Sepulveda et al. |
| 6,175,777 B1 | 1/2001 | Kim |
| 6,178,390 B1 | 1/2001 | Jun |
| 6,181,013 B1 | 1/2001 | Liu et al. |
| 6,183,345 B1 | 2/2001 | Kamono et al. |
| 6,185,324 B1 | 2/2001 | Ishihara et al. |
| 6,191,864 B1 | 2/2001 | Sandhu |
| 6,192,291 B1 | 2/2001 | Kwon |
| 6,197,604 B1 | 3/2001 | Miller et al. |
| 6,204,165 B1 | 3/2001 | Ghoshal |
| 6,210,983 B1 | 4/2001 | Atchison et al. |
| 6,211,094 B1 | 4/2001 | Jun et al. |
| 6,212,961 B1 | 4/2001 | Dvir |
| 6,214,734 B1 | 4/2001 | Bothra et al. |
| 6,217,412 B1 | 4/2001 | Campbell et al. |
| 6,219,711 B1 | 4/2001 | Chari |
| 6,222,936 B1 | 4/2001 | Phan et al. |
| 6,226,563 B1 | 5/2001 | Lim |
| 6,226,792 B1 | 5/2001 | Goiffon et al. |
| 6,228,280 B1 | 5/2001 | Li et al. |
| 6,230,069 B1 | 5/2001 | Campbell et al. |
| 6,236,903 B1 | 5/2001 | Kim et al. |
| 6,237,050 B1 | 5/2001 | Kim et al. |
| 6,240,330 B1 | 5/2001 | Kurtzberg et al. |
| 6,240,331 B1 | 5/2001 | Yun |
| 6,245,581 B1 | 6/2001 | Bonser et al. |
| 6,246,972 B1 | 6/2001 | Klimasauskas |
| 6,248,602 B1 | 6/2001 | Bode et al. |
| 6,249,712 B1 | 6/2001 | Boiquaye |
| 6,252,412 B1 | 6/2001 | Talbot et al. |
| 6,253,366 B1 | 6/2001 | Mutschler, III |
| 6,259,160 B1 | 7/2001 | Lopatin et al. |
| 6,263,255 B1 | 7/2001 | Tan et al. |
| 6,268,270 B1 | 7/2001 | Scheid et al. |
| 6,271,670 B1 | 8/2001 | Caffey |
| 6,276,989 B1 | 8/2001 | Campbell et al. |
| 6,277,014 B1 | 8/2001 | Chen et al. |
| 6,278,899 B1 | 8/2001 | Piche et al. |
| 6,280,289 B1 | 8/2001 | Wiswesser et al. |
| 6,281,127 B1 | 8/2001 | Shue |
| 6,284,622 B1 | 9/2001 | Campbell et al. |
| 6,287,879 B1 | 9/2001 | Gonzales et al. |
| 6,290,572 B1 | 9/2001 | Hofmann |
| 6,291,367 B1 | 9/2001 | Kelkar |
| 6,292,708 B1 | 9/2001 | Allen et al. |
| 6,298,274 B1 | 10/2001 | Inoue |
| 6,298,470 B1 | 10/2001 | Breiner et al. |
| 6,303,395 B1 | 10/2001 | Nulman |
| 6,304,999 B1 | 10/2001 | Toprac et al. |
| 6,307,628 B1 | 10/2001 | Lu et al. |
| 6,314,379 B1 | 11/2001 | Hu et al. |
| 6,317,643 B1 | 11/2001 | Dmochowski |
| 6,320,655 B1 | 11/2001 | Matsushita et al. |
| 6,324,481 B1 | 11/2001 | Atchison et al. |
| 6,334,807 B1 | 1/2002 | Lebel et al. |
| 6,336,841 B1 | 1/2002 | Chang |
| 6,339,727 B1 | 1/2002 | Ladd |
| 6,340,602 B1 | 1/2002 | Johnson et al. |
| 6,345,288 B1 | 2/2002 | Reed et al. |
| 6,345,315 B1 | 2/2002 | Mishra |
| 6,346,426 B1 | 2/2002 | Toprac et al. |
| 6,355,559 B1 | 3/2002 | Havemann et al. |
| 6,360,133 B1 | 3/2002 | Campbell et al. |
| 6,360,184 B1 | 3/2002 | Jacquez |
| 6,363,294 B1 | 3/2002 | Coronel et al. |
| 6,366,934 B1 | 4/2002 | Cheng et al. |
| 6,368,879 B1 | 4/2002 | Toprac |
| 6,368,883 B1 | 4/2002 | Bode et al. |
| 6,368,884 B1 | 4/2002 | Goodwin et al. |
| 6,379,980 B1 | 4/2002 | Toprac |
| 6,381,564 B1 | 4/2002 | David et al. |
| 6,388,253 B1 | 5/2002 | Su |
| 6,389,491 B1 | 5/2002 | Jacobson et al. |
| 6,391,780 B1 | 5/2002 | Shih et al. |
| 6,395,152 B1 | 5/2002 | Wang |
| 6,397,114 B1 | 5/2002 | Eryurek et al. |
| 6,400,162 B1 | 6/2002 | Mallory et al. |
| 6,405,096 B1 | 6/2002 | Toprac et al. |
| 6,405,144 B1 | 6/2002 | Toprac et al. |
| 6,417,014 B1 | 7/2002 | Lam et al. |
| 6,427,093 B1 | 7/2002 | Toprac |
| 6,432,728 B1 | 8/2002 | Tai et al. |
| 6,435,952 B1 | 8/2002 | Boyd et al. |
| 6,438,438 B1 | 8/2002 | Takagi et al. |
| 6,440,295 B1 | 8/2002 | Wang |
| 6,442,496 B1 | 8/2002 | Pasadyn et al. |
| 6,449,524 B1 | 9/2002 | Miller et al. |
| 6,455,415 B1 | 9/2002 | Lopatin et al. |
| 6,455,937 B1 | 9/2002 | Cunningham |
| 6,465,263 B1 | 10/2002 | Coss, Jr. et al. |
| 6,470,230 B1 | 10/2002 | Toprac et al. |
| 6,479,902 B1 | 11/2002 | Lopatin et al. |
| 6,479,990 B1 | 11/2002 | Mednikov et al. |
| 6,482,660 B1 | 11/2002 | Conchieri et al. |
| 6,484,064 B1 | 11/2002 | Campbell |
| 6,486,492 B1 | 11/2002 | Su |
| 6,492,281 B1 | 12/2002 | Song et al. |
| 6,495,452 B1 | 12/2002 | Shih |
| 6,503,839 B1 | 1/2003 | Gonzales et al. |
| 6,515,368 B1 | 2/2003 | Lopatin et al. |
| 6,517,413 B1 | 2/2003 | Hu et al. |
| 6,517,414 B1 | 2/2003 | Tobin et al. |
| 6,528,409 B1 | 3/2003 | Lopatin et al. |
| 6,529,789 B1 | 3/2003 | Campbell et al. |
| 6,532,555 B1 | 3/2003 | Miller et al. |
| 6,535,783 B1 | 3/2003 | Miller et al. |
| 6,537,912 B1 | 3/2003 | Agarwal |
| 6,539,267 B1 | 3/2003 | Eryurek et al. |
| 6,540,591 B1 | 4/2003 | Pasadyn et al. |
| 6,541,401 B1 | 4/2003 | Herner et al. |
| 6,546,508 B1 | 4/2003 | Sonderman et al. |
| 6,556,881 B1 | 4/2003 | Miller |
| 6,560,504 B1 | 5/2003 | Goodwin et al. |
| 6,563,308 B1 | 5/2003 | Nagano et al. |
| 6,567,717 B1 | 5/2003 | Krivokapic et al. |
| 6,580,958 B1 | 6/2003 | Takano |
| 6,587,744 B1 | 7/2003 | Stoddard et al. |
| 6,590,179 B1 | 7/2003 | Tanaka et al. |
| 6,604,012 B1 | 8/2003 | Cho et al. |
| 6,605,549 B1 | 8/2003 | Leu et al. |
| 6,607,976 B1 | 8/2003 | Chen et al. |

| | | | | | | |
|---|---|---|---|---|---|---|
| 6,609,946 B1 | 8/2003 | Tran | | EP | 1 067 757 A1 | 1/2001 |
| 6,616,513 B1 | 9/2003 | Osterheld | | EP | 1 071 128 A2 | 1/2001 |
| 6,618,692 B1 | 9/2003 | Takahashi et al. | | EP | 1 083 470 A2 | 3/2001 |
| 6,624,075 B1 | 9/2003 | Lopatin et al. | | EP | 1 092 505 A2 | 4/2001 |
| 6,625,497 B1 | 9/2003 | Fairbairn et al. | | EP | 1 072 967 A3 | 11/2001 |
| 6,630,741 B1 | 10/2003 | Lopatin et al. | | EP | 1 182 526 A2 | 2/2002 |
| 6,640,151 B1 | 10/2003 | Somekh et al. | | GB | 2 347 885 A | 9/2000 |
| 6,652,355 B1 | 11/2003 | Wiswesser et al. | | GB | 2 365 215 A | 2/2002 |
| 6,660,633 B1 | 12/2003 | Lopatin et al. | | JP | 61-66104 | 4/1986 |
| 6,678,570 B1 | 1/2004 | Pasadyn et al. | | JP | 61-171147 | 8/1986 |
| 6,684,114 B1 | 1/2004 | Erickson et al. | | JP | 01-283934 | 11/1989 |
| 6,687,558 B1 * | 2/2004 | Tuszynski ............ 700/97 | | JP | 3-202710 | 9/1991 |
| 6,708,074 B1 | 3/2004 | Chi et al. | | JP | 05-151231 | 6/1993 |
| 6,708,075 B1 | 3/2004 | Sonderman et al. | | JP | 05-216896 | 8/1993 |
| 6,725,402 B1 | 4/2004 | Coss, Jr. et al. | | JP | 05-266029 | 10/1993 |
| 6,728,587 B1 | 4/2004 | Goldman et al. | | JP | 06-110894 | 4/1994 |
| 6,735,492 B1 | 5/2004 | Conrad et al. | | JP | 06-176994 | 6/1994 |
| 6,748,280 B1 | 6/2004 | Zou et al. | | JP | 06-184434 | 7/1994 |
| 6,751,518 B1 | 6/2004 | Sonderman et al. | | JP | 06-252236 | 9/1994 |
| 6,766,214 B1 | 7/2004 | Wang et al. | | JP | 06-260380 | 9/1994 |
| 6,774,998 B1 | 8/2004 | Wright et al. | | JP | 8-23166 | 1/1996 |
| 2001/0001755 A1 | 5/2001 | Sandhu et al. | | JP | 08-50161 | 2/1996 |
| 2001/0003084 A1 | 6/2001 | Finarov | | JP | 08-149583 | 6/1996 |
| 2001/0006873 A1 | 7/2001 | Moore | | JP | 08-304023 | 11/1996 |
| 2001/0030366 A1 | 10/2001 | Nakano et al. | | JP | 09-34535 | 2/1997 |
| 2001/0039462 A1 | 11/2001 | Mendez et al. | | JP | 9-246547 | 9/1997 |
| 2001/0040997 A1 | 11/2001 | Tsap et al. | | JP | 10-34522 | 2/1998 |
| 2001/0042690 A1 | 11/2001 | Talieh | | JP | 10-173029 | 6/1998 |
| 2001/0044667 A1 | 11/2001 | Nakano et al. | | JP | 11-67853 | 3/1999 |
| 2002/0032499 A1 | 3/2002 | Wilson et al. | | JP | 11-126816 | 5/1999 |
| 2002/0058460 A1 | 5/2002 | Lee et al. | | JP | 11-135601 | 5/1999 |
| 2002/0070126 A1 | 6/2002 | Sato et al. | | JP | 2000-183001 | 6/2000 |
| 2002/0077031 A1 | 6/2002 | Johannson et al. | | JP | 2001-76982 | 3/2001 |
| 2002/0081951 A1 | 6/2002 | Boyd et al. | | JP | 2001-284299 | 10/2001 |
| 2002/0089676 A1 | 7/2002 | Pecen et al. | | JP | 2001-305108 | 10/2001 |
| 2002/0102853 A1 | 8/2002 | Li et al. | | JP | 2002-9030 | 1/2002 |
| 2002/0107599 A1 | 8/2002 | Patel et al. | | JP | 2002-343754 | 11/2002 |
| 2002/0107604 A1 | 8/2002 | Riley et al. | | TW | 434103 | 5/2001 |
| 2002/0113039 A1 | 8/2002 | Mok et al. | | TW | 436383 B | 5/2001 |
| 2002/0127950 A1 | 9/2002 | Hirose et al. | | TW | 455938 B | 9/2001 |
| 2002/0128805 A1 | 9/2002 | Goldman et al. | | TW | 455976 | 9/2001 |
| 2002/0149359 A1 | 10/2002 | Crouzen et al. | | WO | WO 95/34866 | 12/1995 |
| 2002/0165636 A1 | 11/2002 | Hasan | | WO | WO 98/05066 | 2/1998 |
| 2002/0183986 A1 | 12/2002 | Stewart et al. | | WO | WO 98/45090 | 10/1998 |
| 2002/0185658 A1 | 12/2002 | Inoue et al. | | WO | WO 99/09371 | 2/1999 |
| 2002/0193899 A1 | 12/2002 | Shanmugasundram et al. | | WO | WO 99/25520 | 5/1999 |
| 2002/0193902 A1 | 12/2002 | Shanmugasundram et al. | | WO | WO 99/59200 | 11/1999 |
| 2002/0197745 A1 | 12/2002 | Shanmugasundram et al. | | WO | WO 00/00874 | 1/2000 |
| 2002/0197934 A1 | 12/2002 | Paik | | WO | WO 00/05759 | 2/2000 |
| 2002/0199082 A1 | 12/2002 | Shanmugasundram et al. | | WO | WO 00/35063 | 6/2000 |
| 2003/0017256 A1 | 1/2003 | Shimane | | WO | WO 00/54325 | 9/2000 |
| 2003/0020909 A1 | 1/2003 | Adams et al | | WO | WO 00/79355 A1 | 12/2000 |
| 2003/0020928 A1 | 1/2003 | Ritzdorf et al. | | WO | WO 01/11679 A1 | 2/2001 |
| 2003/0154062 A1 | 8/2003 | Daft et al. | | WO | WO 01/15865 A1 | 3/2001 |
| 2004/0073319 A1 | 4/2004 | Monari | | WO | WO 01/18623 A1 | 3/2001 |
| 2004/0267395 A1 * | 12/2004 | Discenzo et al. ............ 700/99 | | WO | WO 01/25865 A1 | 4/2001 |
| 2005/0107895 A1 * | 5/2005 | Pistikopoulos et al. ....... 700/52 | | WO | WO 01/33277 A1 | 5/2001 |
| | | | | WO | WO 01/33501 A1 | 5/2001 |
| FOREIGN PATENT DOCUMENTS | | | | WO | WO 01/52055 A3 | 7/2001 |
| CA | 2165847 | 8/1991 | | WO | WO 01/52319 A1 | 7/2001 |
| CA | 2194855 | 8/1991 | | WO | WO 01/57823 A2 | 8/2001 |
| EP | 0 397 924 A1 | 11/1990 | | WO | WO 01/80306 A2 | 10/2001 |
| EP | 0 621 522 A2 | 10/1994 | | WO | WO 02/17150 A1 | 2/2002 |
| EP | 0 747 795 A2 | 12/1996 | | WO | WO 02/31613 A2 | 4/2002 |
| EP | 0 869 652 A2 | 10/1998 | | WO | WO 02/31613 A3 | 4/2002 |
| EP | 0 877 308 A2 | 11/1998 | | WO | WO 02/33737 A2 | 4/2002 |
| EP | 0 881 040 A2 | 12/1998 | | | | |
| EP | 0 895 145 A1 | 2/1999 | | | | |
| EP | 0 910 123 A1 | 4/1999 | | | | |
| EP | 0 932 194 A1 | 7/1999 | | | | |
| EP | 0 932 195 A1 | 7/1999 | | | | |
| EP | 1 066 925 A2 | 1/2001 | | | | |

WO WO 02/074491 9/2002

OTHER PUBLICATIONS

Spanos, Costas J., Hai-Fang Guo, Alan Miller, and Joanne Levine-Parrill. Nov. 1992. "Real-Time Statistical Process Control Using Tool Data." *IEEE Transactions on Semiconductor Manufacturing*, v. 5, n. 4, pp. 308-318.

Kurtzberg, Jerome M. and Menachem Levanoni. Jan. 1994. "ABC: A Better Control for Manufacturing." *IBM Journal of Research and Development*, v. 38, n. 1, pp. 11-30.

Mozumder, Purnendu K. and Gabriel G. Barna. Feb. 1994. "Statistical Feedback Control of a Plasma Etch Process." *IEEE Transactions on Semiconductor Manufacturing*, v. 7, n. 1, pp. 1-11.

Edgar, Thomas F., Stephanie W. Butler, W. Jarrett Campbell, Carlos Pfeiffer, Christopher Bode, Sung Bo Hwang, K. S. Balakrishnan, and J. Hahn. Nov. 2000. "Automatic Control in Microelectronics Manufacturing: Practices, Challenges, and Possibilities (Abstract)." *Automatica*, v. 36, n. 11.

U.S. Appl. No. 09/363,966, filed Jul. 29, 1999, Arackaparambil et al., Computer Integrated Manufacturing Techniques.

U.S. Appl. No. 09/469,227, filed Dec. 22, 1999, Somekh et al., Multi-Tool Control System, Method and Medium.

U.S. Appl. No. 09/619,044, filed Jul. 19, 2000, Yuan, System and Method of Exporting or Importing Object Data in a Manufacturing Execution System.

U.S. Appl. No. 09/637,620, filed Aug. 11, 2000, Chi et al., Generic Interface Builder.

U.S. Appl. No. 09/656,031, filed Sep. 6, 2000, Chi et al., Dispatching Component for Associating Manufacturing Facility Service Requestors with Service Providers.

U.S. Appl. No. 09/655,542, filed Sep. 6, 2000, Yuan, System, Method and Medium for Defining Palettes to Transfrom an Application Program Interface for a Service.

U.S. Appl. No. 09/725,908, filed Nov. 30, 2000, Chi et al., Dynamic Subject Information Generation in Message Services of Distributed Object Systems.

U.S. Appl. No. 09/800,980, filed Mar. 8, 2001, Hawkins et al., Dynamic and Extensible Task Guide.

U.S. Appl. No. 09/811,667, filed Mar. 20, 2001, Yuan et al., Fault Tolerant and Automated Computer Software Workflow.

U.S. Appl. No. 09/927,444, filed Aug. 13, 2001, Ward et al., Dynamic Control of Wafer Processing Paths in Semiconductor Manufacturing Processes.

U.S. Appl. No. 09/928,473, filed Aug. 14, 2001, Koh, Tool Services Layer for Providing Tool Service Functions in Conjunction with Tool Functions.

U.S. Appl. No. 09/928,474, filed Aug. 14, 2001, Krishnamurthy et al., Experiment Management System, Method and Medium.

U.S. Appl. No. 09/943,383, filed Aug. 31, 2001, Shanmugasundram et al., In Situ Sensor Based Control of Semiconductor Processing Procedure.

U.S. Appl. No. 09/943,955, filed Aug. 31, 2001, Shanmugasundram et al., Feedback Control of a Chemical Mechanical Polishing Device Providing Manipulation of Removal Rate Profiles.

U.S. Appl. No. 09/998,372, filed Nov. 30, 2001, Paik, Control of Chemical Mechanical Polishing Pad Conditioner Directional Velocity to Improve Pad Life.

U.S. Appl. No. 09/998,384, filed Nov. 30, 2001, Paik, Feedforward and Feedback Control for Conditioning of Chemical Mechanical Polishing Pad.

U.S. Appl. No. 10/084,092, filed Feb. 28, 2002, Arackaparambil et al., Computer Integrated Manufacturing Techniques.

U.S. Appl. No. 10/100,184, filed Mar. 19, 2002, Al-Bayati et al., Method, System and Medium for Controlling Semiconductor Wafer Processes Using Critical Dimension Measurements.

U.S. Appl. No. 10/135,405, filed May 1, 2002, Reiss et al., Integration of Fault Detection with Run-to-Run Control.

U.S. Appl. No. 10/135,451, filed May 1, 2002, Shanmugasundram et al., Dynamic Metrology Schemes and Sampling Schemes for Advanced Process Control in Semiconductor Processing.

U.S. Appl. No. 10/172,977, filed Jun. 18, 2002, Shanmugasundram et al., Method, System and Medium for Process Control for the Matching of Tools, Chambers and/or Other Semiconductor-Related Entities.

U.S. Appl. No. 10/173,108, filed Jun. 18, 2002, Shanmugasundram et al., Integrating Tool, Module, and Fab Level Control.

U.S. Appl. No. 10/174,370, filed Jun. 18, 2002, Shanmugasundram et al., Feedback Control of Plasma-Enhanced Chemical Vapor Deposition Processes.

U.S. Appl. No. 10/174,377, filed Jun. 18, 2002, Schwarm et al., Feedback Control of Sub-Atmospheric Chemical Vapor Deposition Processes.

U.S. Appl. No. 10/377,654, filed Mar. 4, 2003, Kokotov et al. Method, System and Medium for Controlling Manufacturing Process Using Adaptive Models Based on Empirical Data.

U.S. Appl. No. 10/393,531, filed Mar. 21, 2003, Shanmugasundram et al., Copper Wiring Module Control.

U.S. Appl. No. 10/632,107, filed Aug. 1, 2003, Schwarm et al., Method, System, and Medium for Handling Misrepresentative Metrology Data Within an Advanced Process Control System.

U.S. Appl. No. 10/665,165, filed Sep. 18, 2003, Paik, Feedback Control of a Chemical Mechanical Polishing Process for Multi-Layered Films.

U.S. Appl. No. 10/712,273, filed Nov. 14, 2003, Kokotov, Method, System and Medium for Controlling Manufacture Process Having Multivariate Input Parameters.

U.S. Appl. No. 10/759,108, filed. Jan. 20, 2004, Schwarm, Automated Design and Execution of Experiments with Integrated Model Creation for Semiconductor Manufacturing Tools.

U.S. Appl. No. 10/765,921, filed Jan. 29, 2004, Schwarm, System, Method, and Medium for Monitoring Performance of an Advanced Process Control System.

U.S. Appl. No. 10/809,906, filed Mar. 26, 2004, Surana et al., A Technique for Process-Qualifying a Semiconductor Manufacturing Tool Using Metrology Data.

U.S. Appl. No. 10/809,908, filed Mar. 26, 2004, Yang et al., Improved Control of Metal Resistance in Semiconductor Products via Integrated Metrology.

U.S. Appl. No. 10/812,480, filed Mar. 30, 2004, Padhi et al., Selective Metal Encapsulation Schemes.

U.S. Appl. No. 10/855,711, May 28, 2004, Paik, Dynamic Offset and Feedback Threshold.

Miller, G. L., D. A. H. Robinson, and J. D. Wiley, Jul. 1976. "Contactless measurement of semiconductor conductivity by radio frequency-free-carrier power absorption." *Rev. Sci. Instrum.*, vol. 47, No. 7. pp. 799-805.

Ostanin, Yu.Ya. Oct. 1981. "Optimization of Thickness Inspection of Electrically Conductive Single-Layer Coatings with Laid-on-Eddy-Current Transducers (Abstract)." *Defektoskopiya*, vol. 17, No. 10, pp. 45-52, Moscow, USSR.

Feb. 1984. "Method and Apparatus of in Situ Measurement and Overlay Error Analysis for Correcting Step and Repeat Lithographic Cameras." *IBM Technical Disclosure Bulletin*, pp. 4855-4859.

Feb. 1984. "Substrate Screening Process." *IBM Technical Disclosure Bulletin*, pp. 4824-4825.

Oct. 1984. "Method to Characterize the Stability of a Step and Repeat Lithographic System." *IBM Technical Disclosure Bulletin*, pp. 2857-2860.

Levine, Martin D. 1985. *Vision in Man and Machine*. New York: McGraw-Hill, Inc. pp. ix-xii, 1-58.

Herrmann, D. 1988. "Temperature Errors and Ways of Elimination for Contactless Measurement of Shaft Vibrations (Abstract)." *Technisches Messen*™, vol. 55, No. 1, pp. 27-30. West Germany.

Runyan, W. R., and K. E. Bean. 1990. "Semiconductor Integrated Circuit Processing Technology." p. 48. Reading, Massachusetts: Addison-Wesley Publshing Company.

Chang, Norman H. and Costas J. Spanos. Feb. 1991. "Continuous Equipment Diagnosis Using Evidence Integration: An LPCVD Application." *IEEE Transactions on Semiconductor Manufacturing*, v. 4, n. 1, pp. 43-51.

Larrabee, G. B. May 1991. "The Intelligent Microelectronics Factory of the Future (Abstract)." *IEEE/SEMI International Semiconductor Manufacturing Science Symposium*, pp. 30-34. Burlingame, CA.

Burke, Peter A. Jun. 1991. "Semi-Empirical Modelling of SiO2 Chemical-Mechanical Polishing Planarization." *VMIC Conference, 1991 IEEE*, pp. 379-384. IEEE.

Zorich, Robert. 1991. *Handbook of Quality Integrated Circuit Manufacturing*. pp. 464-498 San Diego, California: Academic Press, Inc.

Rampalli, Prasad, Arakere Ramesh, and Nimish Shah. 1991. CEPT—*A Computer-Aided Manufacturing Application for Managing Equipment Reliability and Availability in the Semiconductor Industry*. New York, New York: IEEE.

May 1992. "Laser Ablation Endpoint Detector." *IBM Technical Disclosure Bulletin*, pp. 333-334.

Feb. 1993. "Electroless Plating Scheme to Hermetically Seal Copper Features." *IBM Technical Disclosure Bulletin*, pp. 405-406.

Scarr, J. M. and J. K. Zelisse. Apr. 1993. "New Topology for Thickness Monitoring Eddy Current Sensors (Abstract)." *Proceedings of the 36th Annual Technical Conference*, Dallas, Texas.

Hu, Albert, Kevin Nguyen, Steve Wong, Xiuhua Zhang, Emanuel Sachs, and Peter Renteln. 1993. "Concurrent Deployment of Run by Run Controller Using SCC Framework." IEEE/SEMI International Semiconductor Manufacturing Science Symposium. pp. 126-132.

Matsuyama, Akira and Jessi Niou. 1993. "A State-of-the-Art Automation System of an ASIC Wafer Fab in Japan." *IEEE/SEMI International Semiconductor Manufacturing Science Symposium*, pp. 42-47.

Yeh, C. Eugene, John C. Cheng, and Kwan Wong. 1993. "Implementation Challenges of a Feedback Control System for Wafer Fabrication." *IEEE/CHMT International Electronics Manufacturing Technology Symposium*, pp. 438-442.

Muller-Heinzerling, Thomas, Ulrich Neu, Hans Georg Nurnberg, and Wolfgang May. Mar. 1994. "Recipe-Controlled Operation of Batch Processes with Batch X." *ATP Automatisierungstechnische Praxis*, vol. 36, No. 3, pp. 43-51.

Stoddard, K., P. Crouch, M. Kozicki, and K. Tsakalis. Jun.-Jul. 1994. "Application of Feedforward and Adaptive Feedback Control to Semiconductor Device Manufacturing (Abstract)." *Proceedings of 1994 American Control Conference—ACC'94*, vol. 1, pp. 892-896. Baltimore, Maryland.

Rocha, Joao and Carlos Ramos. Sep. 12, 1994. "Task Planning for Flexible and Agile Manufacturing Systems." *Intelligent Robots and Systems '94. Advanced Robotic Systems and the Real World, IROS '94. Proceedings of the IEEE/RSJ/GI International Conference on Munich, Germany* Sep. 12-16, 1994. New York, New York: IEEE, pp. 105-112.

Schaper, C. D., M. M. Moslehi, K. C. Saraswat, and T. Kailath. Nov. 1994. "Modeling Identification, and Control of Rapid Thermal Processing Systems (Abstract)." *Journal of the Electrochemical Society*, vol. 141, No. 11, pp. 3200-3209.

Tao, K. M., R. L. Kosut, M. Ekblad, and G. Aral. Dec. 1994. "Feedforward Learning Applied to RTP of Semiconductor Wafers (Abstract)." *Proceedings of the 33rd IEEE Conference on Decision and Control*, vol. 1, pp. 67-72. Lake Buena Vista, Florida.

Hu, Albert, He Du, Steve Wong, Peter Renteln, and Emmanuel Sachs. 1994. "Application of Run by Run Controller to the Chemical-Mechanical Planarization Process." *IEEE/CPMT International Electronics Manufacturing Technology Symposium*, pp. 371-378.

Spanos, C. J., S. Leang, S.-Y. Ma, J. Thomson, B. Bombay, and X. Niu. May 1995. "A Multistep Supervisory Controller for Photolithographic Operations (Abstract)." *Proceedings of the Symposium on Process Control, Diagnostics, and Modeling in Semiconductor Manufacturing*. pp. 3-17.

Moyne, James, Roland Telfeyan, Arnon Hurwitz, and John Taylor. Aug. 1995. "A Process-Independent Run-to-Run Controller and Its Application to Chemical-Mechanical Planarization." *SEMI/IEEE Advanced Semiconductor Manufacturing Conference and Workshop*. Ann Arbor, Michigan: The University of Michigan, Electrical Engineering & Computer Science Center for Display Technology & Manufacturing.

Zhou, Zhen-Hong and Rafael Reif. Aug. 1995. "Epi-Film Thickness Measurements Using Emission Fourier Transform Infrared Spectroscopy—Part II: Real-Time in situ Process Monitoring and Control." IEEE Transactions on Semiconductor Manufacturing, vol. 8, No. 3.

Telfeyan, Roland, James Moyne, Nauman Chaudhry, James Pugmire, Scott Shellman, Duane Boning, William Moyne, Arnon Hurwitz, and John Taylor. Oct. 1995. "A Multi-Level Approach to the Control of a Chemical-Mechanical Planarization Process." Minneapolis, Minnesota: 42nd National Symposium of the American Vacuum Society.

Chang, E., B. Stine, T. Maung, R. Divecha, D. Boning, J. Chung, K. Chang, G. Ray, D. Bradbury, O. S. Nakagawa, S. Oh, and D. Bartelink. Dec. 1995. "Using a Statistical Metrology Framework to Identify Systematic and Random Sources of Die- and Wafer-level ILD Thickness Variation in CMP Processes." Washington, D.C.: International Electron Devices Meeting.

Moyne, James R., Nauman Chaudhry, and Roland Telfeyan. 1995. "Adaptive Extensions to a Multi-Branch Run-to-Run Controller for Plasma Etching." *Journal of Vacuum Science and Technology*. Ann Arbor, Michigan: University of Michigan Display Technology Manufacturing Center.

Schmid, Hans Albrecht. 1995. "Creating the Architecture of a Manufacturing Framework by Design Patterns." Austin, Texas: OOPSLA.

Dishon, G., M. Finarov, R. Kipper, J.W. Curry, T. Schraub, D. Trojan, 4th Stambaugh, Y. Li and J. Ben-Jacob. Feb. 1996. "On-Line Integrated Metrology for CMP Processing." Santa Clara, California: VMIC Speciality Conferences, 1st International CMP Planarization Conference.

Leang, Sovarong, Shang-Yi Ma, John Thomson, Bart John Bombay, and Costas J. Spanos. May 1996. "A Control System for Photolithographic Sequences." *IEEE Transactions on Semiconductor Manufacturing*, vol. 9, No. 2.

Smith, Taber, Duane Boning, James Moyne, Arnon Hurwitz and John Curry. Jun. 1996. "Compensating for CMP Pad Wear Using Run by Run Feedback Control." Santa Clara, California: Proceedings of the Thirteenth International VLSI Multilevel Interconnection Conference. pp. 437-439.

Boning, Duane S., William P. Moyne, Taber H. Smith, James Moyne, Ronald Telfeyan, Arnon Hurwitz, Scott Shellman, and John Taylor. Oct. 1996. "Run by Run Control of Chemical-Mechanical Polishing." *IEEE Transactions on Components, Packaging, and Manufacturing Technology—Part C*, vol. 19, No. 4, pp. 307-314.

Zhe, Ning, J. R. Moyne, T. Smith, D. Boning, E. Del Castillo, Yeh Jinn-Yi, and Hurwitz. Nov. 1996. "A Comparative Analysis of Run-to-Run Control Algorithms in Semiconductor Manufacturing Industry (Abstract)." *IEEE/SEMI 1996 Advanced Semiconductor Manufacturing Conference Workshop*, pp. 375-381.

Yasuda, M., T. Osaka, and M. Ikeda. Dec. 1996. "Feedforward Control of a Vibration Isolation System for Disturbance Suppression (Abstract)." *Proceeding of the 35th IEEE Conference on Decision and Control*, vol. 2, pp. 1229-1233. Kobe, Japan.

Fan, Jr-Min, Ruey-Shan Guo, Shi-Chung Chang, and Kian-Huei Lee. 1996. "Abnormal Trend Detection of Sequence-Disordered Data Using EWMA Method." *IEEE/SEMI Advanced Semiconductor Manufacturing Conference*, pp. 169-174.

SEMI. [1986]0 1996. "Standard for Definition and Measurement of Equipment Reliability, Availability, and Maintainability (RAM)." SEMI E10-96.

Smith, Taber and Duane Boning. 1996. "A Self-Tuning EWMA Controller Utilizing Artificial Neural Network Function Approximation Techniques." *IEEE/CPMT International Electronics Manufacturing Technology Symposium*, pp. 355-363.

Guo, Ruey-Shan, Li-Shia Huang, Argon Chen, and Jin-Jung Chen. Oct. 1997. "A Cost-Effective Methodology for a Run-by-Run EWMA Controller." 6th *International Symposium on Semiconductor Manufacturing*, pp. 61-64.

Mullins, J. A., W. J. Campbell, and A. D. Stock. Oct. 1997. "An Evaluation of Model Predictive Control in Run-to-Run Processing in Semiconductor Manufacturing (Abstract)." *Proceedings of the SPIE—The International Society for Optical Engineering Conference*, vol. 3213, pp. 182-189.

Reitman, E. A., D. J. Friedman, and E. R. Lory. Nov. 1997. "Pre-Production Results Demonstrating Multiple-System Models for Yield Analysis (Abstract)." *IEEE Transactions on Semiconductor Manufacturing*, vol. 10, No. 4, pp. 469-481.

Durham, Jim and Myriam Roussel. 1997. "A Statistical Method for Correlating In-Line Defectivity to Probe Yield." *IEEE/SEMI Advanced Semiconductor Manufacturing Conference*, pp. 76-77.

Shindo, Wataru, Eric H. Wang, Ram Akella, and Andrzej J. Strojwas. 1997. "Excursion Detection and Source Isolation in Defect Inspection and Classification." $2^{nd}$ *International Workshop on Statistical Metrology*, pp. 90-93.

Van Zant, Peter. 1997. *Microchip Fabrication: A Practical Guide to Semiconductor Processing*. Third Edition, pp. 472-478. New York, New York: McGraw-Hill.

Campbell, W. Jarrett, and Anthony J. Toprac. Feb. 11-12, 1998. "Run-to-Run Control in Microelectronics Manufacturing." Advanced Micro Devises, TWMCC.

Edgar, Thomas F., Stephanie W. Butler, Jarrett Campbell, Carlos Pfeiffer, Chris Bode, Sung Bo Hwang, and K.S. Balakrishnan. May 1998. "Automatic Control in Microelectronics Manufacturing: Practices, Challenges, and Possibilities." Automatica, vol. 36, pp. 1567-1603, 2000.

Moyne, James, and John Curry. Jun. 1998. "A Fully Automated Chemical-Mechanical Planarization Process." Santa Clara, California: VLSI Multilevel Interconnection (V-MIC) Conference.

Jul. 1998. "Active Controller: Utilizing Active Databases for Implementing Multistep Control of Semiconductor Manufacturing (Abstract)." *IEEE Transactions on Components, Packaging and Manufacturing Technology—Part C*, vol. 21, No. 3, pp. 217-224.

SEMI. Jul. 1998. *New Standard: Provisional Specification for CIM Framework Domain Architecture*. Mountain View, California: SEMI Standards. SEMI Draft.

Consilium. Aug. 1998. *Quality Management Component: QMC™ and QMC-Link™ Overview*. Mountain View, California: Consilium, Inc.

Chemali, Chadi El, James Moyne, Kareemullah Khan, Rock Nadeau, Paul Smith, John Colt, Jonathan Chapple-Sokol, and Tarun Parikh. Nov. 1998. "Multizone Uniformity Control of a CMP Process Utilizing a Pre and Post-Measurement Strategy." Seattle, Washington: SEMETECH Symposium.

Consilium. 1998. *FAB300™*, Mountain View, California: Consilium, Inc.

Fang. S. J., A. Barda, T. Janecko, W. Little, D. Outley, G. Hempel, S. Joshi, B. Morrison, G. B. Shinn, and M. Birang. 1998. "Control of Dielectric Chemical Mechanical Polishing (CMP) Using and Interferometry Based Endpoint Sensor." *International Proceedings of the IEEE Interconnect Technology Conference*, pp. 76-78.

Khan, Kareemullah, Victor Solakhain, Anthony Ricci, Tier Gu, and James Moyne. 1998. "Run-to-Run Control of ITO Deposition Process." Ann Arbor, Michigan.

Ouma, Dennis, Duane Boning, James Chung, Greg Shinn, Leif Olsen, and John Clark. 1998. "An Integrated Characterization and Modeling Methodology for CMP Dielectric Planarization." *Proceedings of the IEEE 1998 International Interconnect Technology Conference*, pp. 67-69.

Sun, S.C. 1998. "CVD and PVD Transition Metal Nitrides as Diffusion Barriers for Cu Metallization." *IEEE*. pp. 243-246.

Suzuki, Junichi and Yoshikazu Yamamoto. 1998. "Toward the Interoperable Software Design Models: Quartet of UML, XML, DOM and CORBA." Proceedings IEEE International Software Engineering Standards Symposium. pp. 1-10.

Consilium, Jan. 1999. "FAB300™; Consilium's Next Generation MES Solution of Software and Services which Control and Automate Real-Time FAB Operations." www.consilium.com/products/fab300_page.htm#FAB300 Introduction.

Boning, Duane S., Jerry Stefani, and Stephanie W. Butler. Feb. 1999. "Statistical Methods for Semiconductor Manufacturing." *Encyclopedia of Electrical Engineering*, J. G. Webster, Ed.

McIntosh, John. Mar. 1999. "Using CD-SEM Metrology in the Manufacture of Semiconductors (Abstract)." *JOM* vol. 51, No. 3, pp. 38-39.

Pan, J. Tony, Ping Li, Kapila Wijekoon, Stan Tsai, and Fritz Redeker. May 1999. "Copper CMP Integration and Time Dependent Pattern Effect." *IEEE 1999 International Interconnect Technology Conference*, pp. 164-166.

Klein, Bruce. Jun. 1999. "Application Development: XML Makes Object Models More Useful." *Informationweek*. pp. 1A-6A.

Baliga, John. July 1999. "Advanced Process Control: Soon to be a Must." Cahners Semiconductor International. www.semiconductor.net/semiconductor/issues/1999/jul99/docs/feature1.asp.

Consilium. Jul. 1999. "Increasing Overall Equipment Effectiveness (OEE) in Fab Manufacturing by Implementing Consilium's Next-Generation Manufacturing Execution System—MES II." Semiconductor Fabtech Edition 10.

Meckl, P. H. and K. Umemoto. Aug. 1999. "Achieving Fast Motions in Semiconductor Manufacturing Machinery (Abstract)." *Proceedings of the 1999 IEEE International Conference on Control Applications*, vol. 1, pp. 725-729. Kohala Coast, HI.

Consilium Corporate Brochure. Oct. 1999. www.consilium.com.

Khan, K., C. El Chemali, J. Moyne, J. Chapple-Sokol, R. Nadeau, P. Smith, C., and T. Parikh. Oct. 1999. "Yield Improvement at the Contact Process Through Run-to-Run Control (Abstract)." $24^{th}$ *IEEE/CPMT Electronics Manufacturing Technology Symposium*, pp. 258-263.

Moyne, James. Oct. 1999. "Advancements in CMP Process Automation and Control." Hawaii: (Invited paper and presentation to) Third International Symposium on Chemical Mechanical Polishing in IC Device Manufacturing: $196^{th}$ Meeting of the Electrochemical Society.

Williams, Randy, Dadi Gudmundsson, Kevin Monoahan, Raman Nurani, Meryl Stoller and J. George Shanthikumar. Oct. 1999. "Optimized Sample Planning for Wafer Defect Inspection," *Semiconductor Manufacturing Conference Proceedings, 1999 IEEE International Symposium on Santa Clara*, CA. Piscataway, NJ. pp. 43-46.

Consilium. Nov. 1999. *FAB300™ Update*.

Ruegsegger, Steven, Aaron Wagner, James S. Freudenberg, and Dennis S. Grimard. Nov. 1999. "Feedforward Control for Reduced Run-to-Run Variation in Microelectronics Manufacturing." *IEEE Transactions on Semiconductor Manufacturing*, vol. 12, No. 4.

1999. "Contactless Bulk Resistivity/Sheet Resistance Measurement and Mapping Systems." www. Lehighton.com/fabtech1/index.html.

Nov. 1999. "How to Use EWMA to Achieve SPC and EPC Control." *International Symposium on NDT Contribution to the Infrastructure Safety Systems*, Tores, Brazil. <http://www.ndt.net/abstract/ndtiss99/data/35.htm>.

Edgar, T. F., W. J. Campbell, and C. Bode. Dec. 1999. "Model-Based Control in Microelectronics Manufacturing." *Proceedings of the $38^{th}$ IEEE Conference on Decision and Control*, Phoenix, Arizona, vol. 4, pp. 4185-4191.

Tagami, M., A. Furuya, T. Onodera, and Y. Hayashi. 1999. "Layered Ta-nitrides (LTN) Barrier Film by Power Swing Sputtering (PSS) Technique for MOCVD-Cu Damascene Interconnects." *IEEE*. pp. 635-638.

Meckl, P. H. and K. Umemoto. Apr. 2000. "Achieving Fast Motions by Using Shaped Reference Inputs [Semiconductor Manufacturing Machine] (Abstract)." *NEC Research and Development*, vol. 41, No. 2, pp. 232-237.

Chemali, Chadi El, James Moyne, Kareemullah Khan, Rock Nadeau, Paul Smith, John Colt, Jonathan Chapple-Sokol, and Tarun Parikh. Jul./Aug. 2000. "Multizone Uniformity Control of a Chemical Mechanical Polishing Process Utilizing a Pre- and Postmeasurement Strategy." J. Vac. Sci. Technol. A, vol. 18(4). pp. 1287-1296. American Vacuum Society.

Oechsner, R., T. Tschaftary, S. Sommer, L. Pfitzner, H. Ryssel, H. Gerath, C. Baier, and M. Hafner. Sep. 2000. "Feed-forward Control for a Lithography/Etch Sequence (Abstract)." *Proceedings of the SPIE—The International Society for Optical Engineering Conference*, vol. 4182, pp. 31-39.

Cheung, Robin. Oct. 18, 2000. "Copper Interconnect Technology." *AVS/CMP User Group Meeting*, Santa Clara, CA.

Khan, S., M. Musavi, and H. Ressom. Nov. 2000. "Critical Dimension Control in Semiconductor Manufacturing (Abstract)." *ANNIE 2000. Smart Engineering Systems Design Conference*, pp. 995-1000. St. Louis, Missouri.

ACM Research Inc. 2000. "Advanced Copper Metallization for 0.13 to 0.05 μm & Beyond." <http://acmrc.com/press/ACM-ECP-brochure.pdf>.

Ravid, Avi, Avner Sharon, Amit Weingarten, Vladimir Machavariani, and David Scheiner. 2000. "Copper CMP Planarity Control Using ITM." *IEEE/SEMI Advanced Semiconductor Manufacturing Conference*, pp. 437-443.

SEMI. 2000. "Provisional Specification for CIM Framework Scheduling Component." San Jose, California. SEMI E105-1000.

Yamagishi, H., Z. Tokei, G.P. Beyer, R. Donaton, H. Bender, T. Nogami, and K. Maex. 2000. "TEM/SEM Investigation and Electrical Evaluation of a Bottomless I-PVD TA(N) Barrier in Dual Damascene" (Abstract). *Advanced Metallization Conference 2000*. San Diego, CA.

2000. "Microsense II Capacitance Gaging System." www.adetech.com.

Chen, Argon and Ruey-Shan Guo. Feb. 2001. "Age-Based Double EWMA Controller and Its Application to CMP Processes." *IEEE Transactions on Semiconductor Manufacturing*, vol. 14, No. 1, pp. 11-19.

Mar. 5, 2001. "KLA-Tencor Introduces First Production-worthy Copper CMP In-situ Film Thickness and End-point Control System." http://www.kla-tencor.com/j/servlet/NewsItem?newsItemID=74.

Lee, Brian, Duane S. Boning, Winthrop Baylies, Noel Poduje, Pat Hester, Yong Xia, John Valley, Chris Koliopoulus, Dale Hetherington, HongJiang Sun, and Michael Lacy. Apr. 2001. "Wafer Nanotopography Effects on CMP: Experimental Validation of Modeling Methods." San Francisco, California: Materials Research Society Spring Meeting.

Tobin, K. W., T. P. Karnowski, L. F. Arrowood and F. Lakhani. Apr. 2001. "Field Test Results of an Automated Image Retrieval System (Abstract)." *Advanced Semiconductor Manufacturing Conference, 2001 IEEE/SEMI*, Munich, Germany.

Tan, K. K., H. F. Dou, and K. Z. Tang. May-Jun. 2001. "Precision Motion Control System for Ultra-Precision Semiconductor and Electronic Components Manufacturing (Abstract)." *51st Electronic Components and Technology Conference 2001. Proceedings*, pp. 1372-1379. Orlando, Florida.

Jensen, Alan, Peter Renteln, Stephen Jew, Chris Raeder, and Patrick Cheung. Jun. 2001. "Empirical-Based Modeling for Control of CMP Removal Uniformity." Solid State Technology, vol. 44, No. 6, pp. 101-102, 104, 106. Cowan Publ. Corp.: Washington, D.C.

Jul. 5, 2001. "Motorola and Advanced Micro Devices Buy ObjectSpace Catalyst Advanced Process Control Product for Five Wafer Fabs." Semiconductor FABTECH. www.semiconductorfabtech.com/industry.news/9907/20.07.shtml.

Heuberger, U. Sep. 2001. "Coating Thickness Measurement with Dual-Function Eddy-Current & Magnetic Inductance Instrument (Abstract)." *Galvanotechnik*, vol. 92, No. 9, pp. 2354-2366+IV.

Pilu, Maurizio, Sep. 2001. "Undoing Page Curl Distortion Using Applicable Surfaces." *IEEE International Conference on Image Processing*. Thessalonica, Greece.

Oct. 15, 2001. Search Report prepared by the Austrian Patent Office for Singapore Patent Application. No. 200004286-1.

Eisenbraun, Eric, Oscar van der Straten, Yu Zhu, Katharine Dovidenko, and Alain Kaloyeros. 2001. "Atomic Layer Deposition (ALD) of Tantalum-Based Materials for Zero Thickness Copper Barrier Applications" (Abstract). *IEEE*. pp. 207-209.

Smith, S.R., K.E. Elers, T. Jacobs, V. Blaschke, and K. Pfeifer. 2001. "Physical and Electrical Characterization of ALD Tin Used as a Copper Diffusion Barrier in 0.25 mum, Dual Damascene Backend Structures" (Abstract). *Advanced Metallization Conference 2001*. Montreal, Quebec.

Wang, LiRen and Hefin Rowlands. 2001. "A Novel NN-Fuzzy-SPC Feedback Control System." *8th IEEE International Conference on Emerging Technologies and Factory Automation*, pp. 417-423.

NovaScan 2020. Feb. 2002. "Superior Integrated Process Control for Emerging CMP High-End Applications.".

Mar. 15, 2002. Office Action for U.S. Appl. No. 09/469,227, filed Dec. 22, 1999.

Mar. 29, 2002. Office Action for U.S. Appl. No. 09/363,966, filed Jul. 29, 1999.

Moyne, J., V. Solakhian, A. Yershov, M. Anderson, and D. Mockler-Hebert. Apr.-May 2002. "Development and Deployment of a Multi-Component Advanced Process Control System for an Epitaxy Tool (Abstract)." *2002 IEEE Advanced Semiconductor Manufacturing Conference and Workshop*, pp. 125-130.

Sarfaty, Moshe, Arulkumar Shanmugasundram, Alexander Schwarm, Joseph Paik, Jimin Zhang, Rong Pan, Martin J. Seamons, Howard Li, Raymond Hung, and Suketu Parikh. Apr.-May 2002. "Advance Process Control Solutions for Semiconductor Manufacturing." Boston, Massachusetts: *13th Annual IEEE/SEMI Advanced Semiconductor Manufacturing Conference. Advancing the Science and Technology of Semiconductor Manufacturing. ASMC 2002*, pp. 101-106.

Campbell, W. J., S. K. Firth, A. J. Toprac, and T. F. Edgar. May 2002. "A Comparison of Run-to-Run Control Algorithms (Abstract)." *Proceedings of 2002 American Control Conference*, vol. 3, pp. 2150-2155.

Good, Richard and S. Joe Qin. May 2002. "Stability Analysis of Double EWMA Run-to-Run Control with Metrology Delay." *IEEE/CPMT International Electronics Manufacturing Technology Symposium*, pp. 355-363.

Smith, Stewart, Anthony J. Walton, Alan W. S. Ross, Georg K. H. Bodammer, and J. T. M. Stevenson. May 2002. "Evaluation of Sheet Resistance and Electrical Linewidth Measurement Techniques for Copper Damascene Interconnect." *IEEE Transactions on Semiconductor Manufacturing*, vol. 15, No. 2, pp. 214-222.

Johnson, Bob. Jun. 10, 2002. "Advanced Process Control Key to Moore's Law." Gartner, Inc.

Jun. 20, 2002. Office Action for U.S. Appl. No. 09/619,044, filed Jul. 19, 2000.

Itabashi, Takeyuki, Hiroshi Nakano, and Haruo Akahoshi. Jun. 2002. "Electroless Deposited CoWB for Copper Diffusion Barrier Metal." *IEEE International Interconnect Technology Conference*, pp. 285-287.

Jul. 9, 2002. International Search Report for PCT/US01/24910.

Jul. 23, 2002. Communication Pursuant to Article 96(2) EPC for European Patent Application No. 00 115 577.9.

Jul. 29, 2002. International Search Report for PCT/US01/27407.

Sep. 26, 2002. Office Action for U.S. Appl. No. 09/637,620, filed Aug. 11, 2000.

Oct. 4, 2002. International Search Report for PCT/US01/22833.

Oct. 15, 2002. International Search Report for PCT/US02/19062.

Oct. 23, 2002. International Search Report for PCT/US01/27406.

Oct. 23, 2002. Office Action for U.S. Appl. No. 09/469,227, filed Dec. 22, 1999.

Nov. 7, 2002. International Search Report for PCT/US02/19061.

Nov. 11, 2002. International Search Report for PCT/US02/19117.

Nov. 12, 2002. International Search Report for PCT/US02/19063.

Dec. 17, 2002. Office Action for U.S. Appl. No. 09/363,966, filed Jul. 29, 1999.

ACM Research, Inc. 2002. "ACM Ultra ECP® System: Electro-Copper Plating (ECP) Deposition." www.acmrc.com/ecp.html.

Applied Materials, Inc. 2002. "Applied Materials: Information for Everyone: Copper Electrochemical Plating." www.appliedmaterials.com/products/copper_electrochemical_plating.html.

Elers, Kai-Erik, Ville Saanila, Pekka J. Soininen, Wei-Min Li, Juhana T. Kostamo, Suvi Haukka, Jyrki Juhanoja, and Wim F.A. Besling. 2002. "Diffusion Barrier Deposition on a Copper Surface by Atomic Layer Deposition" (Abstract). *Advanced Materials*. vol. 14, No. 13-14, pp. 149-153.

Kim, Y.T. and H. Sim. 2002. "Characteristics of Pulse Plasma Enhanced Atomic Layer Deposition of Tungsten Nitride Diffusion Barrier for Copper Interconnect" (Abstract). *IEIC Technical Report*. vol. 102, No. 178, pp. 115-118.

KLA-Tencor Corporation. 2002. "KLA Tencor: Press Release: KLA-Tencor Introduces First Production-Worthy Copper CMP In-Situ Film Thickness and End-point Control System: Multi-Million Dollar Order Shipped to Major CMP Tool Manufacturer." www.kla-tencor.com/news_events/press_releases/press_releases2001/984086002.html.

Peng, C.H., C.H. Hsieh, C.L. Huang, J.C. Lin, M.H. Tsai, M.W. Lin, C.L. Chang, Winston S. Shue, and M.S. Liang. 2002. "A 90nm Generation Copper Dual Damascene Technology with ALD TaN Barrier." *IEEE*. pp. 603-606.

Sonderman, Thomas. 2002. "APC as a Competitive Manufacturing Technology: *AMD's Vision for 300mm*." AEC/APC.

Takahashi, Shingo, Kaori Tai, Hiizu Ohtorii, Naoki Komai, Yuji Segawa, Hiroshi Horikoshi, Zenya Yasuda, Hiroshi Yamada, Masao Ishihara, and Takeshi Nogami. 2002. "Fragile Porous Low-k/Copper Integration by Using Electro-Chemical Polishing." *2002 Symposium on VLSI Technology Digest of Technical Papers*, pp. 32-33.

Van der Straten, O., Y. Zhu, E. Eisenbraun, and A. Kaloyeros. 2002. "Thermal and Electrical Barrier Performance Testing of Ultrathin Atomic Layer Deposition Tantalum-Based Materials for Nanoscale Copper Metallization." *IEEE*. pp. 188-190.

Wu, Z.C., Y.C. Lu, C.C. Chiang, M.C. Chen, B.T.Chen, G.J. Wang, Y.T. Chen, J.L. Huang, S.M. Jang, and M.S. Liang. 2002. "Advanced Metal Barrier Free Cu Damascene Interconnects with PECVD Silicon Carbide Barriers for 90/65-nm BEOL Technology." *IEEE*. pp. 595-598.

2002. "Microsense II—5810: Non-Contact Capacitance Gaging Module." www.adetech.com.

Feb. 10, 2003. Office Action for U.S. Appl. No. 09/619,044, filed Jul. 19, 2000.

Mar. 25, 2003. International Search Report for PCT/US02/24859.

Apr. 9, 2003. Office Action for U.S. Appl. No. 09/928,474, filed Aug. 14, 2001.

May 8, 2003. Office Action for U.S. Appl. No. 09/637,620, filed Aug. 11, 2000.

May 23, 2003. Written Opinion for PCT/US01/24910.

Jun. 18, 2003. Office Action for U.S. Appl. No. 09/655,542, filed Sep. 6, 2000.

Jul. 23, 2003. Invitation to Pay Additional Fees and Communication Relating to the Results of the Partial International Search for PCT/US02/19116.

Jul. 25, 2003. International Search Report for PCT/US02/24858.

Aug. 1, 2003. Written Opinion for PCT/US01/27406.

Aug. 8, 2003. PCT International Search Report from PCT/US03/08513.

Aug. 20, 2003. Written Opinion for PCT/US01/22833.

Aug. 25, 2003. Office Action for U.S. Appl. No. 10/100,184, filed Mar. 19, 2002.

Sep. 15, 2003. Office Action for U.S. Appl. No. 09/928,474, file Aug. 14, 2001.

Oct. 14, 2003. PCT International Search Report from PCT/US02/21942.

Oct. 20, 2003. PCT International Search Report from PCT/US02/19116.

Oct. 23, 2003. PCT International Preliminary Examination Report from PCT/US01/24910.

Nov. 5, 2003. Office Action for U.S. Appl. No. 10/172,977, filed Jun. 18, 2002.

Dec. 1, 2003. Office Action for U.S. Appl. No. 10/173,108, filed Jun. 18, 2002.

"NanoMapper wafer nanotopography measurement by ADE Phase Shift." Printed Dec. 9, 2003. http://www.phase-shift.com/nanomap.shtml.

"Wafer flatness measurement of advanced wafers." Printed Dec. 9, 2003. http://www.phase-shift.com/wafer-flatness.shtml.

"ADE Technologies, Inc.—6360," Printed Dec. 9, 2003. http://www.adetech.com/6360.shtml.

"3D optical profilometer MicroXAM by ADE Phase Shift." Printed Dec. 9, 2003. http://www.phase-shift.com/microxam.shtml.

"NanoMapper FA factory automation wafer nanotopography measurement." Printed Dec. 9, 2003. http://www.phase-shift.com/nanomapperfa.shtml.

Dec. 11, 2003. Office Action for U.S. Appl. No. 09/943,383, filed Aug. 31, 2001.

Dec. 16, 2003. International Search Report for PCT/US03/23964.

Cunningham, James A. 2003. "Using Electrochemistry to Improve Copper Interconnects." <http://www.e-insite.net/semiconductor/index.asp?layout=article&articleid=CA47465>.

Jan. 20, 2004. Office Action for U.S. Appl. No. 09/927,444, filed Aug. 13, 2001.

Jan. 23, 2004. International Search Report for PCT/US02/24860.

Feb. 2, 2004. Office Action for U.S. Appl. No. 09/363,966, filed Jul. 29, 1999.

Mar. 30, 2004. Written Opinion for PCT/US02/19062.

Apr. 9, 2004. Written Opinion for PCT/US02/19116.

Apr. 22, 2004. Office Action for U.S. Appl. No. 09/998,372, filed Nov. 30, 2001.

Apr. 28, 2004. Written Opinion for PCT/US02/19117.

Apr. 29, 2004. Written Opinion for PCT/US02/19061.

May 5, 2004. Office Action for U.S. Appl. No. 09/943,955, filed Aug. 31, 2001.

May 5, 2004. International Preliminary Examination Report for PCT/US01/27406.

May 28, 2004. Office Action for U.S. Appl. No. 09/943,383, filed Aug. 31, 2001.

Jun. 3, 2004. Office Action for U.S. Appl. No. 09/928,474, filed Aug. 14, 2001.

Jun. 23, 2004. Office Action for U.S. Appl. No. 10/686,589, filed Oct. 17, 2003.

Jun. 30, 2004. Office Action for U.S. Appl. No. 09/800,980, filed Mar. 8, 2001.

Jul. 12, 2004. Office Action for U.S. Appl. No. 10/173,108, filed Jun. 8, 2002.

Adams, Bret W., Bogdan Swedek, Rajeev Bajaj, Fritz Redeker, Manush Birang, and Gregory Amico. "Full-Wafer Endpoint Detection Improves Process Control in Copper CMP." *Semiconductor Fabtech*—12th Edition. Applied Materials, Inc., Santa Clara, CA.

Berman, Mike, Thomas Bibby, and Alan Smith. "Review of In Situ & In-line Detection for CMP Applications." *Semiconductor Fabtech*, 8th Edition, pp. 267-274.

Dishon, G., D. Eylon, M. Finarov, and A. Shulman. "Dielectric CMP Advanced Process Control Based on Integrated Monitoring." Ltd. Rehoveth, Israel: Nova Measuring Instruments.

"Semiconductor Manufacturing: An Overview." <http://users.ece.gatech.edu/~gmay/overview.html>.

IslamRaja, M. M., C. Chang, J. P. McVittie, M. A. Cappelli, and K. C. Saraswat. May/Jun. 1993. "Two Precursor Model for Low-Pressure Chemical Vapor Deposition of Silicon Dioxide from Tetraethylorthosilicate." *J. Vac. Sci. Technol. B*, vol. 11, No. 3, pp. 720-726.

Kim, Eui Jung and William N. Gill. Jul. 1994. "Analytical Model for Chemical Vapor Deposition of $SiO_2$ Films Using Tetraethoxysliane and Ozone" (Abstract). *Journal of Crystal Growth*, vol. 140, Issues 3-4, pp. 315-326.

Guo, R.S, A. Chen, C.L. Tseng, I.K. Fong, A. Yang, C.L. Lee, C.H. Wu, S. Lin, S.J. Huang, Y.C. Lee, S.G. Chang, and M.Y. Lee, Jun. 16-17, 1998. "A Real-Time Equipment Monitoring and Fault Detection System." *Semiconductor Manufacturing Technology Workshop*, pp. 111-121.

Lantz, Mikkel. 1999. "Equipment and APC Integration at AMD with Workstream." *IEEE*, pp. 325-327.

Jul. 15, 2004. Office Action for U.S. Appl. No. 10/172,977, filed Jun. 18, 2002.

Aug. 2, 2004. Office Action for U.S. Appl. No. 10/174,377, filed Jun. 18, 2002.

Aug. 9, 2004. Written Opinion for PCT Ser. No. PCT/US02/19063.

Aug. 18, 2004. International Preliminary Examination Report for PCT Ser. No. PCT/US02/19116.

Aug. 24, 2004. Office Action for U.S. Appl. No. 10/135,405, filed May 1, 2002.

Aug. 25, 2004. Office Action for U.S. Appl. No. 09/998,384, filed Nov. 30, 2001.

Sep. 9, 2004. Written Opinion for PCT Ser. No. PCT/US02/21942.

Sep. 16, 2004. International Preliminary Examination Report for PCT Ser. No. PCT/US02/24859.

Sep. 15, 2004. Office Action for U.S. Appl. No. 10/632,107, filed Aug. 1, 2003.

Sep. 29, 2004. Office Action for U.S. Appl. No. 09/363,966, filed Jul. 29, 1999.

Oct. 1, 2004. International Preliminary Examination Report for PCT Ser. No. PCT/US03/23964.

Oct. 6, 2004. Office Action for U.S. Appl. No. 10/759,108, filed Jan. 20, 2004.

Oct. 12, 2004. International Preliminary Examination Report for PCT Ser. No. PCT/US02/19061.

Nov. 17, 2004. Written Opinion for PCT Ser. No. PCT/US01/27407.

US 6,150,664, 11/2000, Su (withdrawn)

* cited by examiner

PROCESS CONTROL BY DISTINGUISHING A WHITE NOISE COMPONENT OF A PROCESS VARIANCE

CROSS-REFERENCE TO RELATED APPLICATIONS

This application is related to co-pending application entitled "Dynamic Offset and Feedback Threshold," filed on even date herewith and incorporated by reference.

BACKGROUND OF THE INVENTION

1. Field of the Invention

The present invention concerns computer-implemented and/or computer-enabled methods, systems, and mediums for enabling improved control of errors during process control. More specifically, one or more embodiments of the present invention relate to distinguishing a variance due to white noise from a statistical process variance measured during process control, particularly in connection with semiconductor manufacturing.

2. Description of the Related Art

Detecting and controlling errors during a manufacturing process is an important goal. This is particularly true in connection with the process of manufacturing semiconductors. During the manufacturing process, various measurements are made in order to detect and/or determine errors, e.g., to detect when an observed value differs significantly from an intended target result. When the difference is sufficient, the manufacturing process control system will attempt to control (e.g., compensate for) the error so as to continue to produce products (e.g., chips) that are within acceptable ranges or tolerances from the target result.

In general, it has been observed that semiconductor devices processed in connection with a semiconductor manufacturing process will inevitably include at least some error or some deviation from the intended target result or specification. In order to determine when it is desired to perform additional control in order to make an adjustment during processing, conventional systems utilize a threshold value as a trigger. Whenever the additional control is triggered and the adjustment is made, however, the result following the adjustment still will usually deviate from the intended target result. Further, there are tolerances within which a tighter adjustment of a control does not effectively cause the material to be processed closer to specification, since the control is simply not capable of a sufficiently fine adjustment.

Conventionally, control of an error is attempted when one or more preconditions assigned to a tolerance range for the target specification, are evaluated using a statistical approach and are satisfied. The conventional statistical approach employs a standard deviation. Nevertheless, even when the process control system uses standard deviation as the threshold value, there is always a lack of precision, or a tolerance range within which it is not truly possible to control more tightly.

A significant reason often preventing tolerance ranges from being controlled more tightly is that some portion of the measurement, including the amount of observed value which is determined to be error, may actually be due to "white noise". White noise does not necessarily represent an "error". White noise represents an uncontrollable (and typically temporary) fluctuation in measurement. One example of white noise in a semiconductor manufacturing system is a sudden and temporary disturbance in ambient temperature, which is neither measured nor controlled, but would result in a change in thickness of the product. When determining whether an error occurred and/or how much (and whether) to compensate for any difference from the desired target result and/or to control an error that may occur during the manufacturing process, white noise should be taken into account.

The true amount of white noise occurring during manufacturing processes is not easily determined. In order to accommodate or adjust for white noise, the semiconductor industry conventionally utilizes a statistical process variance, or standard deviation, determined at optimal conditions, as an estimation of white noise. Thus, statistical process variance that is used as a substitute for what would otherwise be a truer (e.g., more real world) measurement of a general type of white noise is measured while the process, material to be processed, and processing device conditions are at an atypically pristine state. This type of measurement of white noise at pristine conditions yields a measurement during a best looking steady state performance, reflecting what cannot be controlled even at the best of conditions. The measurement at these atypical conditions is then utilized as an estimation of the white noise occurring throughout the manufacturing process under consideration.

The problem with the aforementioned conventional use of measurements at pristine conditions as a white noise estimate, despite its industry acceptance, is that it is not a reasonably accurate reflection of white noise that occurs during real manufacturing conditions. One of many reasons that measurements at pristine conditions do not reasonably reflect true conditions is that materials such as wafers processed in most front and back end processing devices in the semiconductor industry have relationships with or effects on subsequently processed wafers. Accordingly, for example, conditions applied to wafers that were previously processed in a processing device will have residual effects on wafers that are currently being processed in that processing device. An estimation of white noise derived from measurements taken while the processing device is at a steady state, consequently, does not reflect the fluctuations introduced during real-world run-to-run processing.

Regarding the aforementioned conventional techniques, statistical use of standard deviation in connection with observed deviation is illustrated, for example in "Statistical feedback control of a plasma etch process", P. Mozumder et al., IEEE Transactions on Semiconductor Manufacturing, Vol. 7, No. 1 (February 1994) (incorporated herein by reference). The statistical variance $S_k$ at the kth run is calculated using the standard deviation as:

$$s_k = \sqrt{\frac{1}{n-1}\left[\sum_{i=1}^{n} X_{k-i+1}^2 - n(\overline{X})^2\right]} \quad (1)$$

where
n=number of samples
X=deviation of observed value from predicted value

As can be seen, the standard deviation calculation does not distinguish between systematic variation and white noise variation components of the error. Hence, conventionally both the systematic and white noise variations are controlled together, rather than separately.

The conventional process control system thus compares this observed "combined" standard deviation to a threshold in order to determine if the deviation is unacceptable. Once the standard deviation greater than the threshold is detected, a tuning procedure in the process model is invoked in order to appropriately control the deviation. In essence, standard deviation-based methods only act to control when the standard deviation range is outside a particular threshold or trigger. In the conventional process control method, the standard deviation is used to determine the level for the threshold or trigger. Within the threshold, it is assumed that the deviation cannot be sufficiently controlled.

Therefore, there remains a need to have improved control, particularly within a tolerance range associated with a target specification. There also remains a need to address the effects of run-to-run conditions on such measurements.

BRIEF SUMMARY OF THE INVENTION

The present invention provides a way to determine the "error" within standard deviation which is caused by two components: a white noise component and a systematic component. The white noise component is random noise and therefore is relatively non-controllable. The systematic component, in contrast, may be controlled by changing the control parameters. A ratio between the two components is calculated autoregressively. Based on the ratio and using the observed or measured error (as, e.g., typically made over the course of several measurements), the actual value of the error caused by the systematic component is calculated utilizing an autoregressive stochastic sequence. The actual value of this error is then used in determining how to change the control parameters. The autoregressive stochastic sequence addresses the issue of real-time control of the effects of run-to-run deviations, and provides a mechanism that can extract the white noise component from the statistical process variance in real time. This results in an ability to provide tighter control of feedback and feedforward variations and according to one or more embodiments of the present inventions, may be used in conjunction with a dynamic adaptation of estimated gain, estimation of recursive parameters, and dynamic filtration in searching for individual optimum vectors for example.

One potential use of one or more embodiments of the present invention is to provide an estimated gain adjustment which provides optimal weight factors via an autoregressive stochastic sequence.

In accordance with one or more embodiments of the invention, there is provided a computer-implemented method, system and/or a computer program product, for compensating for a variance between a measured characteristic of at least one product produced by a process and a target result of the characteristic, by differentiating a white noise component of the variance from a systematic component of the variance. An observed value is received for at least one product, and a target value is received for the product. A variance is determined between the observed value of at least one product and the target value of the at least one product. A first portion of the variance caused by white noise is determined. A second portion of the variance caused by a systematic component is determined. The first portion and/or second portions are used to adjust the process.

According to one or more embodiments of the invention, the products are semiconductor wafers, and the manufacturing process is an automated semiconductor manufacturing process.

According to one or more embodiments of the invention, the target value is derived from a specification, the specification being selected from at least one of a predetermined specification, and a real-time calculation taken from a plurality of prior observed values of products.

According to one or more embodiments of the invention, the process has at least one control parameter capable of being controlled; and the at least one control parameter is controlled during a process based on the second portion of the variance.

According to one or more embodiments of the invention, the value for each product of the plurality of products including the at least one product is determined; at least the second portion of the variance for the plurality of products is determined and the second portion of the variance is utilized as a threshold; and it is determined whether or not to perform the controlling step for the plurality of products when the observed value is outside the threshold.

According to one or more embodiments of the invention, the process includes at least one device on which the plurality of products including the at least one product is processed, the observed value being relative to the at least one device, the at least one device including the at least one control parameter; and controlling the at least one control parameter includes affecting the at least one device.

According to one or more embodiments of the invention, the process includes a plurality of devices including a first device and a second device on which the plurality of products including the at least one product are processed, the observed value being relative to the first device, the second device including the at least one control parameter; and controlling the at least one control parameter includes affecting at least the second device.

According to one or more embodiments of the present invention, the first portion and second portion are determined over two or more products.

According to one or more embodiments of the invention, the first portion and second portion of the variance are calculated using an autoregressive stochastic sequence.

According to one or more embodiments of the invention, the first portion and second portion of the variance are determined by:

$$\delta_x = y/(1+z)$$

where $\delta_x$ = a value representing the variation that a system can control $\delta_w$ = a value representing the random variation that is not controlled According to one or more embodiments of the invention, the white noise includes at least one of random variance normal deviation, and an ambient fluctuation. Further, according to one or more embodiments of the invention, the first portion and second portion of the variance are calculated using an autoregressive stochastic sequence.

BRIEF DESCRIPTION OF THE SEVERAL VIEWS OF THE DRAWINGS

The above mentioned and other features and advantages of the present invention will become more readily apparent from the following detailed description and the accompanying drawings, in which.

DETAILED DESCRIPTION OF THE INVENTION

Figure 1:
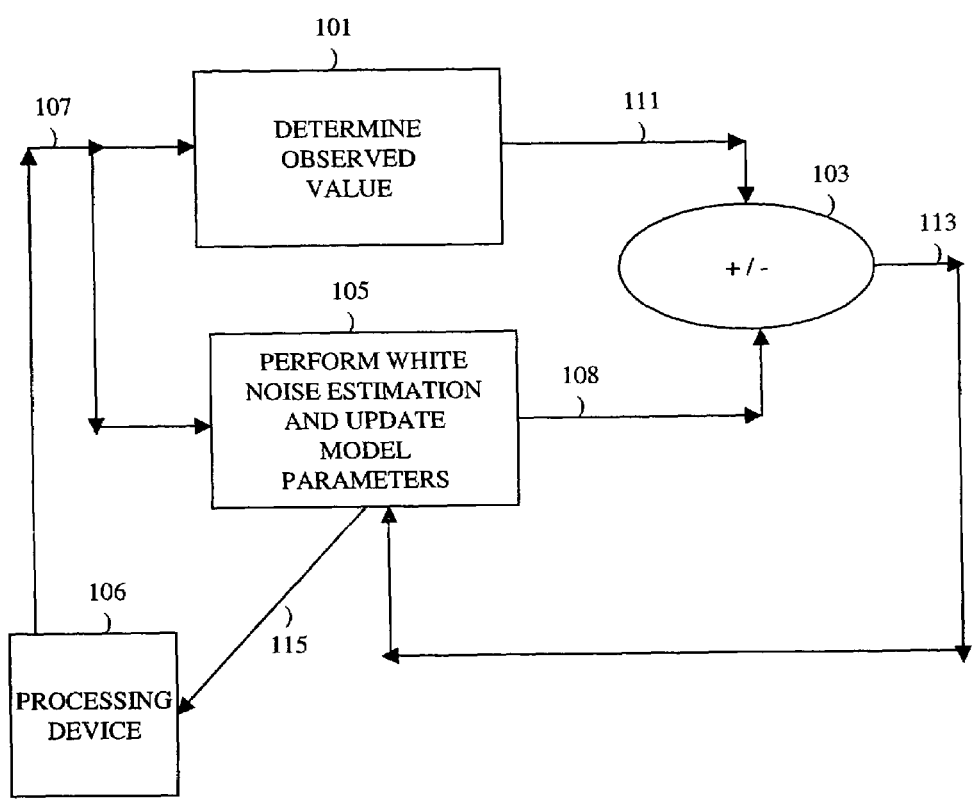
FIG. 1 is an example block diagram of recursive parameter estimation for use in connection with one or more embodiments of the present invention.

The following detailed description includes many specific details. The inclusion of such details is for the purpose of illustration only and should not be understood to limit the invention. Throughout this discussion, similar elements are referred to by similar numbers in the various figures for ease of reference. In addition, features in one embodiment may be combined with features in other embodiments of the invention.

Differentiating the uncontrollable white noise component generated by a processing device from the systematic component, such as controllable errors generated or experienced by the device, assists in identifying an area in which additional control and/or more precise control may be applied within a process control system.

As contemplated by one or more embodiments of the present invention, the value of the white noise component may be extracted from the statistical process variance, such as by utilizing an autoregressive stochastic sequence (such as the one described below). This permits tighter control, which according to one or more embodiments of the present invention is helpful in determining a dynamic threshold for tighter feedback and/or feed forward control, while taking into consideration the real time run-to-run conditions relating to the process, material, and/or processing device.

An $n^{th}$ order autoregressive stochastic sequence may be expressed as:

$$X_k = \rho_1 * X_{k-1} + \rho_2 * X_{k-2} + \ldots + \rho_n * X_{k-n} + W_k \qquad (2)$$

where
$W_k$=white noise
$\rho_n$=auto-correlation coefficient at lag n
$X_k$=deviation of observed value from predicted value at run k For the run-to-run control of the wafers:

$$X_k = \rho_1 * X_{k-1} + W_k \qquad (3)$$

To extract the white noise component, the variance analysis may be taken in two steps according to one or more embodiments of the invention. First, $$V_x = \rho_1^2 * V_x + V_w \qquad (4)$$

where
$V_x$=variance of the signal
$V_w$=variance of the white noise
w=white noise
x=signal Next, $$\delta_w/\delta_x = (1-\rho_1^2)^{0.5} \qquad (5)$$

where δ=standard deviation.

Equation (5) provides an estimated gain adjustment, which is intended in effect to provide optimal weight factors taking into consideration a persistence of error conditions which may affect current conditions. The adjustment has cascaded functions of the above-described autoregressive stochastic sequence of equation (2).

From the above, it can be observed that:

Current parameter=previous parameter estimate+
estimated gain*prediction error (6)

Equations (7), (8) and (9) provide the estimated gain, weight factor and standard deviation derived from samples of the previous wafers.

Estimated Gain weight factor*Gain (7)

Weight factor=$f(\rho_1, \delta_n)$ (8)

where δ=standard deviation from N samples of previous wafers $$\delta_N = \delta_x + \delta_w \qquad (9)$$

From equation (5), the following can be derived:

$$\delta_N = y \qquad (10)$$

where y=calculated value from N samples of the previous wafers and $$\delta_w/\delta_x = z \qquad (11)$$

where z=calculated value from equation (5)
From equations (9), (10) and (11), it follows that:

$$\delta_x = y/(1+z) \qquad (12)$$

where
$\delta_x$=a value representing the variation that a system can control (i.e., the systematic component)
$\delta_w$=a value representing the random variation that is relatively non-controllable (i.e., the white noise component)

Wafers that have been processed in a sequence (run-to-run) by a given device or system typically have a relationship to each other in terms of a variance that they create. In summary, equation (3) is one example of taking into consideration the run-to-run control of wafers; it addresses information representative of the sequence and the relationship between the wafers and the sequence. Equation (4) follows from equations (2) and (3). Equation (5) concerns the ratio between the white noise component and the observed value. Based on the ratio between the white noise component and the observed value, it can be determined what the total amount of error is. By utilizing feed forward analysis, the process in which the error is observed can be appropriately controlled. Estimated gain factors are utilized, as shown in equations (7) and (8). Referring to equation (9), the observed value now has been differentiated into two components, one of which is the white noise component and the other of which is real deviation, also referred to as the systematic component. Equations (10) and (11) follow from the foregoing.

Consider for instance that a CMP processing device will be used in a semiconductor process control system to polish twenty-five wafers. $X_k$ is wafer twenty-four, $X_k-1$ is wafer twenty-three, etc. Because of the relationship and effect run-to-run wafers have on each other, the analysis used herein refers back to the previous wafer(s) (i.e., $X_k-1$, etc.) in determining how much control effectively may be applied to $X_k$, the wafer presently being processed.

Referring to FIG. 1, the measured values (or raw data from which these values can be generated) 107 for samples are obtained from, e.g., a processing device 106 and used by block 101 to determine an observed value and by the white noise estimator and update model parameter block 105. The estimator block 105 performs a white noise estimation, using, for example, the aforementioned auto-regressive stochastic sequence. Estimator block 105 then updates the model parameters (taking the white noise component into account), and produces the predicted value 108 as output, that is, what the measured value is expected to be. In contrast, the process block 101 merely produces an output indicative of the actual measured value 111. At block 103, the positive or negative difference between the predicted output 108 and the actual output 111 is determined. This difference is utilized as the predicted error 113, which is then input back into the estimator block 105 to be used as feedback in connection with the recursive parameter estimation. The estimator block 105 then utilizes the difference in the auto-regressive stochastic sequence (Such as equation (2)) to update the model. The updated model parameters 115 are provided to the processing device 106, e.g., a CMP processing device, a CVD device, an etch device, etc.

According to one or more embodiments of the present invention, the white noise component is differentiated on a real time basis from systematic errors that occur during a manufacturing process. Alternatively, according to other embodiments, the differentiation is performed, but not on a real-time basis. The ability to differentiate the white noise component from the systematic component during real-time may be particularly useful within any number of industries (such as the semiconductor industry) in connection with obtaining higher quality, increased throughput, lower cost of operation, and shorter ramp-up time. Further, one or more embodiments of the present invention may provide more accurate determinations of error and may lead to improved test and yield analysis. One or more embodiments of the present invention are suitable for use in process control systems concerned with, for example, wafer-to-wafer thickness control, uniformity control, within-wafer range control, defect analysis and/or control, etch critical dimension control, chemical vapor deposition thickness and/or uniformity control, physical vapor deposition uniformity and/or thickness control, metrology variations, and other process control, analysis, and/or measurement situations and processing devices.

The following Table 1 illustrates simulated data comparing the calculation of a threshold using standard deviation to the calculation of a threshold with an embodiment of the present invention. In Table 1, the number of minimum samples is N=10.

TABLE 1

| Sample Number | Simulated Sample Value | Threshold with Standard Deviation | Threshold with the Invention |
|---|---|---|---|
| 1 | 3927 | | |
| 2 | 3893 | | |
| 3 | 3797 | | |
| 4 | 3713 | | |
| 5 | 3627 | | |
| 6 | 3602 | | |
| 7 | 3694 | | |
| 8 | 3732 | | |
| 9 | 3753 | | |
| 10 | 3781 | 45.0 | 14.1 |
| 11 | 3739 | 45.0 | 12.3 |
| 12 | 3694 | 45.0 | 9.2 |
| 13 | 3684 | 45.0 | 7.8 |

TABLE 1-continued

| Sample Number | Simulated Sample Value | Threshold with Standard Deviation | Threshold with the Invention |
|---|---|---|---|
| 14 | 3673 | 45.0 | 7.8 |
| 15 | 3743 | 45.0 | 7.9 |
| 16 | 3753 | 45.0 | 5.4 |
| 17 | 3746 | 45.0 | 5.1 |
| 18 | 3710 | 45.0 | 5.3 |
| 19 | 3736 | 45.0 | 5.3 |

As shown in the above example simulated data, the threshold in a conventional process control system utilizing a threshold calculated using standard deviation is calculated to be at 45.0. In other words, the conventional standard deviation approach utilizes a fixed threshold or trigger. Where the observed values are within the threshold, the process control system does not attempt to control the error, whereas if the values are outside the threshold, the process control system does attempt to control the error. In contrast, the threshold calculated utilizing the invention is dynamic and varies, thereby presenting a sensitive threshold in real-time for feedback and feedforward control. The threshold varies from 14.1 down to 5.1 in the simulated data in Table 1. Hence, the present invention offers a more sensitive detection and/or control of "true" errors than the conventional process control system utilizing a fixed threshold.

Values within the threshold can be neglected since they cannot be effectively controlled. On the other hand, outside the threshold it is possible and useful to control the deviation. The reason that one ignores the value below the threshold is that this represents the calculated white noise component, which is not controllable. Once the threshold has been defined more accurately, as with the present invention, better control can be provided.

Figure 2:
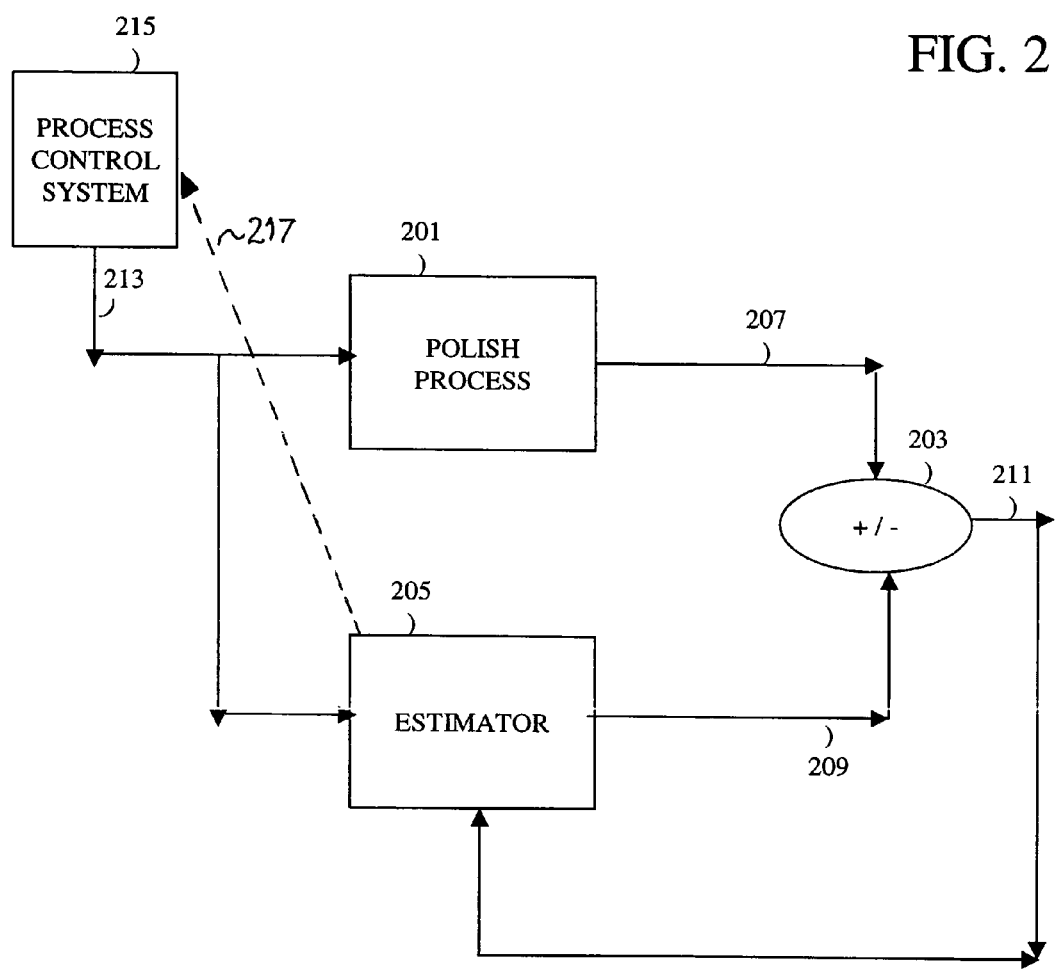
FIG. 2 is a block diagram of an example of the recursive parameter estimation, utilizing the invention illustrated in FIG. 1.

Reference is now made to FIG. 2, a block diagram illustrating use of one or more example embodiments of the present invention in connection with a chemical mechanical polishing ("CMP") process. However, it is not intended to limit the invention to CMP, as it can be applied in connection with a number of processes, such as chemical vapor deposition ("CVD"), or etching or many other processes within the semiconductor industry. Moreover, the present invention may also be used with types of process control systems, in addition to the semiconductor industry, which are concerned with measurement of true error (i.e., error not including white noise) as discriminated from observed error.

In the CMP process example of FIG. 2, the process control system 215 controls the conventional controls of pressure, state, time, flow rate, etc., in connection with the wafers that are to be polished. At block 201, the polish process receives the input wafers together with the parameters 213 describing the polish process. At block 205, the estimator receives from the process control system, parameters 213 describing the target result for the CMP polish process, performs a white noise estimation using an auto-regressive, stochastic sequence, updates the model parameters, and outputs the predicted value 209. The polish process block 201 obtains, determines and outputs observed, actual measurements 207 of the wafers, after they have been polished. The difference between the actual measurements and the predicted value from the estimator block 205 is determined in block 203. Block 203 determines the error in the prediction 211, which is then further input into the estimator block 205, to be used as feedback in connection with the recursive parameter estimation, e.g., to avoid overreacting to the noise which may be present in the observed, actual measurement. According to one or more embodiments of the invention, the noise is approximately extracted by the estimator block 205 utilizing the auto-regressive stochastic sequence discussed above. The updated model parameters 217 may be provided to the process control system 215, e.g., for further use.

Figure 3:
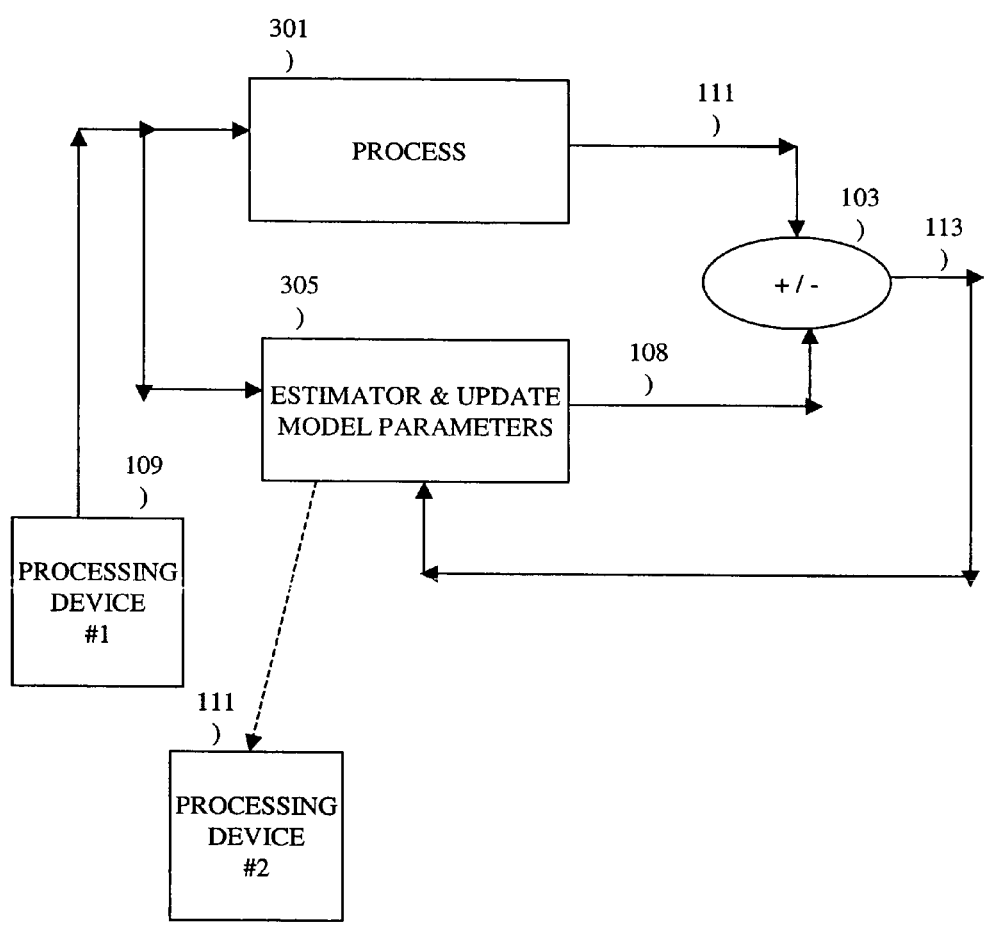
FIG. 3 is a block diagram of recursive parameter estimation, utilizing one or more embodiments of the present invention.

As an example of another use of one or more embodiments of the present invention, consider that a specification is provided which requires the process control system to produce wafers of a certain thickness, among other things, so that a target thickness is achieved. In this particular processing sequence example, shown in FIG. 3, two processing devices 109, 111 are utilized in sequence, so that the second processing device can compensate for the first processing device (e.g., CMP). Referring to FIG. 3, the process block 301 outputs the observed measurements obtained from the first processing device 109, in order to ultimately be used for making feedforward adjustments to the second processing device 111. Those outputs are utilized in determining the variance, or predicted error, at block 103 of the observed values from the predicted values. The predicted error is then utilized to make adjustments to the second processing device 111, after being adjusted for the white noise component via the estimator and update model parameters block 305, preferably utilizing the autoregressive stochastic sequence discussed above. By so doing, the second processing device compensates for deficiencies and variances caused by the first processing device, such that according to this example, the wafers produced from the second processing device are within the range of specified target thickness.

In the above description, the measurement of the products is described as being taken in relation to a pre-determined specification. Alternatively, according to one or more embodiments, the measurements could be taken in relation to a real-time calculation based on prior measurements. In accordance with at least one or more embodiments, multiple specifications could be provided.

Figure 4:
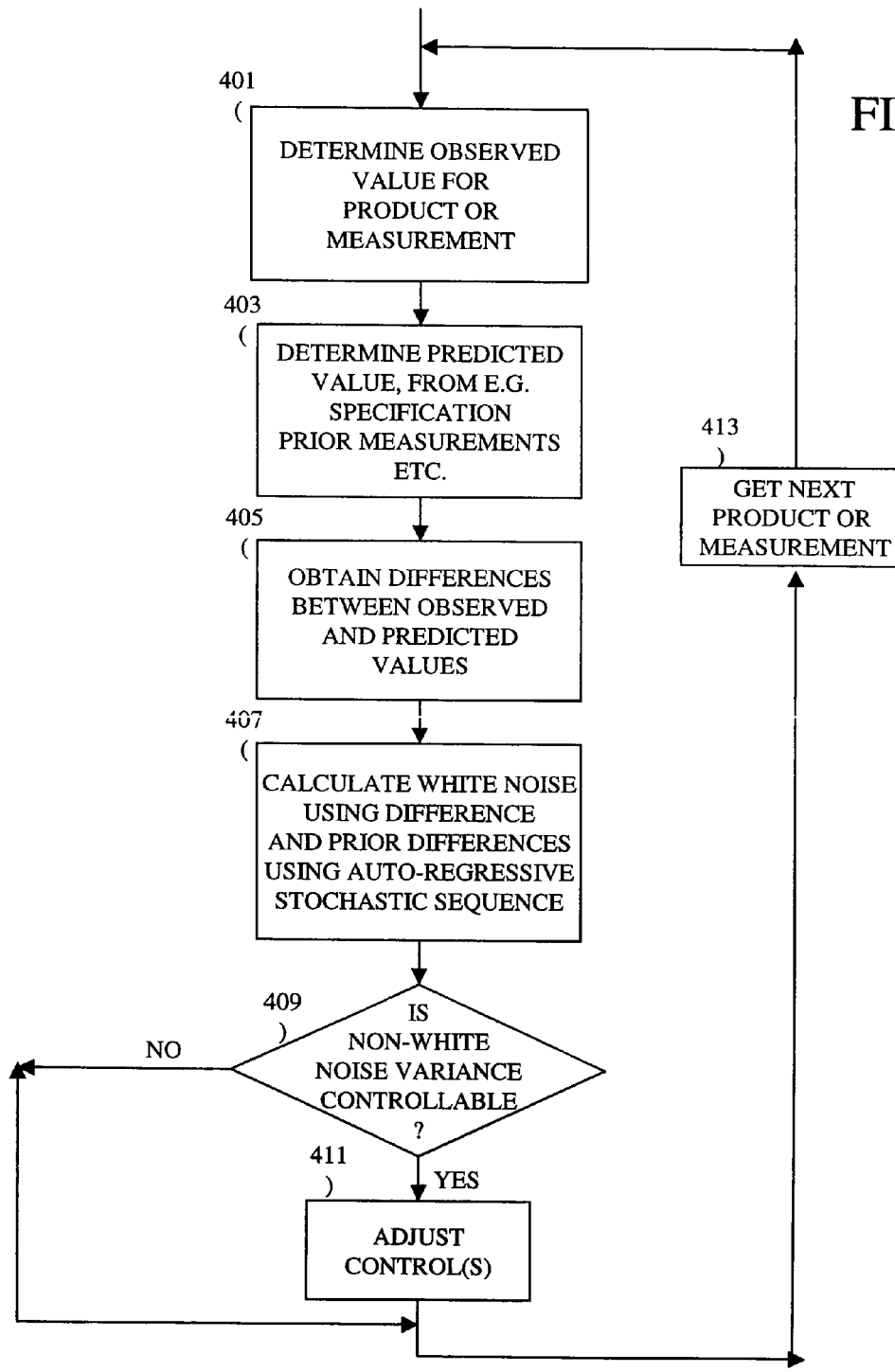
FIG. 4 is a flow chart of the recursive parameter estimation, utilizing the invention illustrated in FIG. 1.

FIG. 4 is a flow chart representing one or more embodiments of the present invention. At step 401 the observed value for the product (or other measurement) is determined. At step 403, the predicted value is determined, including for example from a specification or from a prior measurement, possibly incorporating white noise estimation as indicated in FIG. 1. At step 405, the difference, or predicted error, between the observed value and the predicted value is obtained. At step 407, the white noise component of the observed error is calculated, using the current and prior observed errors, in an auto-regressive, stochastic sequence. At step 409, it is determined whether the non-white noise component of the observed error is controllable, the system may adjust a control parameter 411. (For example, a gas pressure or temperature of the production environment might be adjusted, based on the systematic component.) At step 413, the system gets the next product to be measured, or obtains the next measurement.

Also, as described above, the difference between the measurements of the product, such as a wafer, and the specification for that product is calculated. However, the process control system may also calculate a statistical variance between such measurements and the specification. As described above, the specification could be pre-determined or could be based on a real-time calculation, such as determined by prior measurements.

From the difference or variance between observed values and predicted values, the process control system may, in effect, calculate two components, as explained above. The first component is indicative of that portion of the difference caused by random noise, random variance, and/or normal deviation. The second component determined by the system is indicative of the difference or variation caused by a systematic error or systematic variance over two or more products. Both the first and second components are calculated from a statistical variance.

If the actual variance exceeds a threshold, the process control system then may or may not attempt to control the process. For example, the process control system may adjust one or more control parameters that affect the process and that are relevant to the processing device, such as gas pressure, temperature, etc., thereby controlling the production environment. Hence, the process may be more tightly controlled, based upon the calculated second component of the differences or variance.

Other parameters that can be controlled in connection with semiconductor manufacturing include applying or changing electrical power, placing different gases into a chamber, changing distances between electrodes, etc. There are numerous variables in semi-conductor manufacturing that are to be measured and variances that may be controlled. The present invention is suitable for use in these situations.

This invention is described in connection with the semiconductor manufacturing industry. It can be used with other industries as well, particularly those that utilize measurements in an attempt to control variance in a process control system. The invention concerns determining, preferably but not necessarily in real-time, how much variance in a process control system can or cannot be controlled. According to one or more embodiments, the present invention determines how much of the standard deviation can be reduced and controlled.

Figure 5:
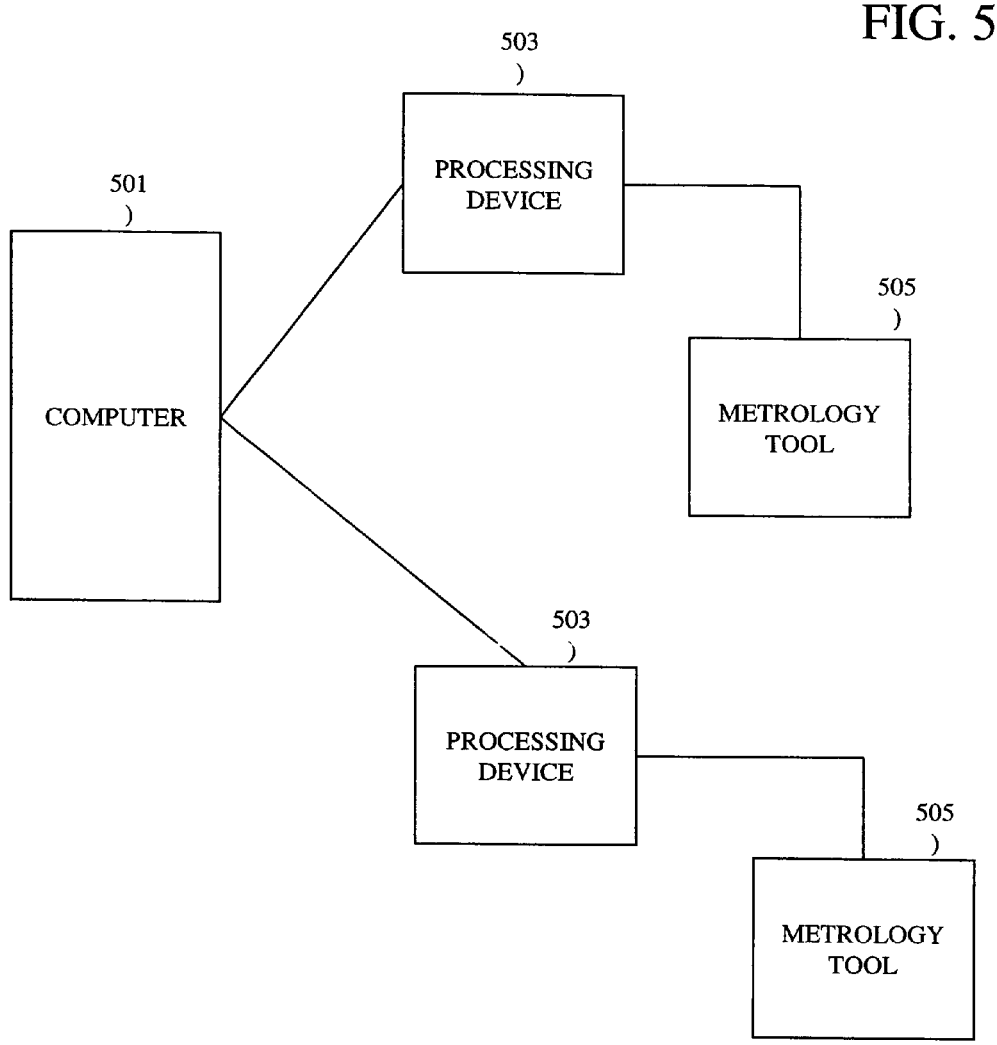
FIG. 5 is a block diagram of a computerized process control system which may be used in connection with one or more embodiments of the present invention.

The process control system used in connection with operation of one or more embodiments of the present invention may include a general purpose computer 501 as illustrated in FIG. 5, or a specially programmed special purpose computer. It may also be implemented as a distributed computer system rather than a single computer; some of the distributed systems might included embedded systems. Further, the programming may be distributed among one or more processing devices 503 themselves or other parts of the process control system. Similarly, the processing could be controlled by a software program on one or more computer systems or processors, or could be partially or wholly implemented in hardware. Moreover, the process control system may communicate directly or indirectly with the relevant processing devices and/or components thereof, such as metrology tools 505. As another alternative, the portion of the process control system that is relevant may be embedded in the processing device itself.

Deviation has been described herein as controlled above a certain threshold. In certain situations, it would be appropriate to consider deviation as controllable in an inverse manner. In other situations, deviation may have a range, above and below which control is possible.

Furthermore, it is possible that the invention could be used in connection with processes that are not part of a process control system, but that use multiple measurements and that are susceptible to white noise. One example is the financial industry, where fluctuations in values over time may be due to some uncontrollable influences, for which a dynamic and/or more precise threshold may be calculated and/or adjustments made.

Figure 6:
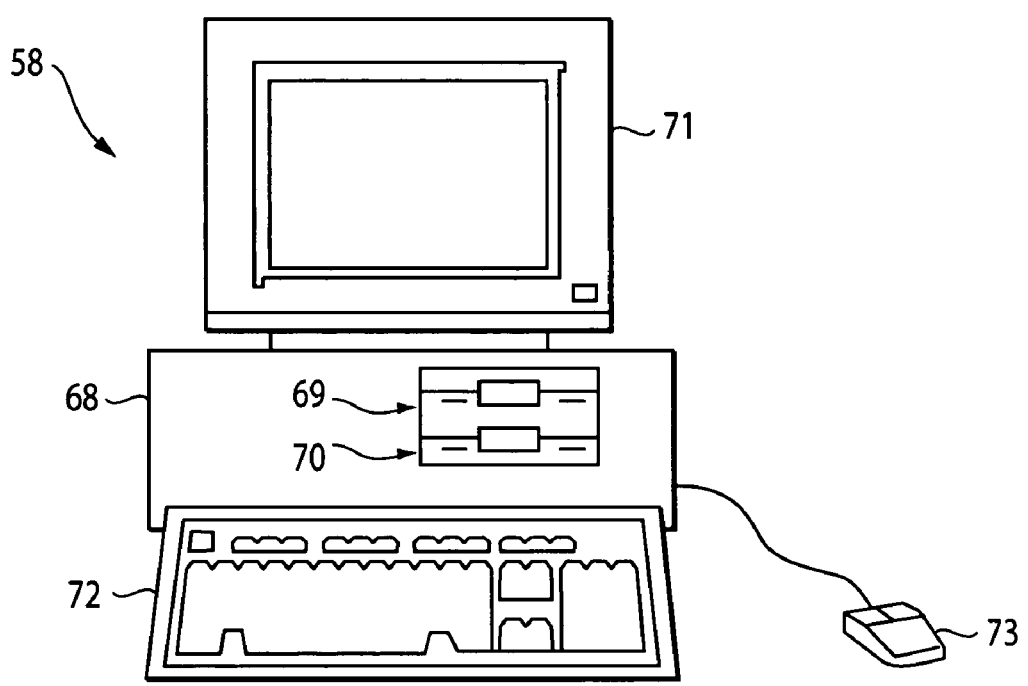
FIG. 6 is an illustration of a computer appropriate for use in connection with one or more embodiments of the present invention.

FIG. 6 is an illustration of a computer 58 used for implementing the computer processing in accordance with a computer-implemented embodiment of the present invention. The procedures described above may be presented in terms of program procedures executed on, for example, a computer or network of computers.

Viewed externally in FIG. 6, computer 58 has a central processing unit (CPU) 68 having disk drives 69, 70. Disk drives 69, 70 are merely symbolic of a number of disk drives that might be accommodated by computer 58. Typically, these might be one or more of the following: a floppy disk drive 69, a hard disk drive (not shown), and a CD ROM or digital video disk, as indicated by the slot at 70. The number and type of drives varies, typically with different computer configurations. Disk drives 69, 70 are, in fact, options, and for space considerations, may be omitted from the computer system used in conjunction with the processes described herein.

Computer 58 also has a display 71 upon which information may be displayed. The display is optional for the computer used in conjunction with the system described herein. A keyboard 72 and/or a pointing device 73, such as a mouse 73, may be provided as input devices to interface with central processing unit 68. To increase input efficiency, keyboard 72 may be supplemented or replaced with a scanner, card reader, or other data input device. The pointing device 73 may be a mouse, touch pad control device, track ball device, or any other type of pointing device.

Figure 7:
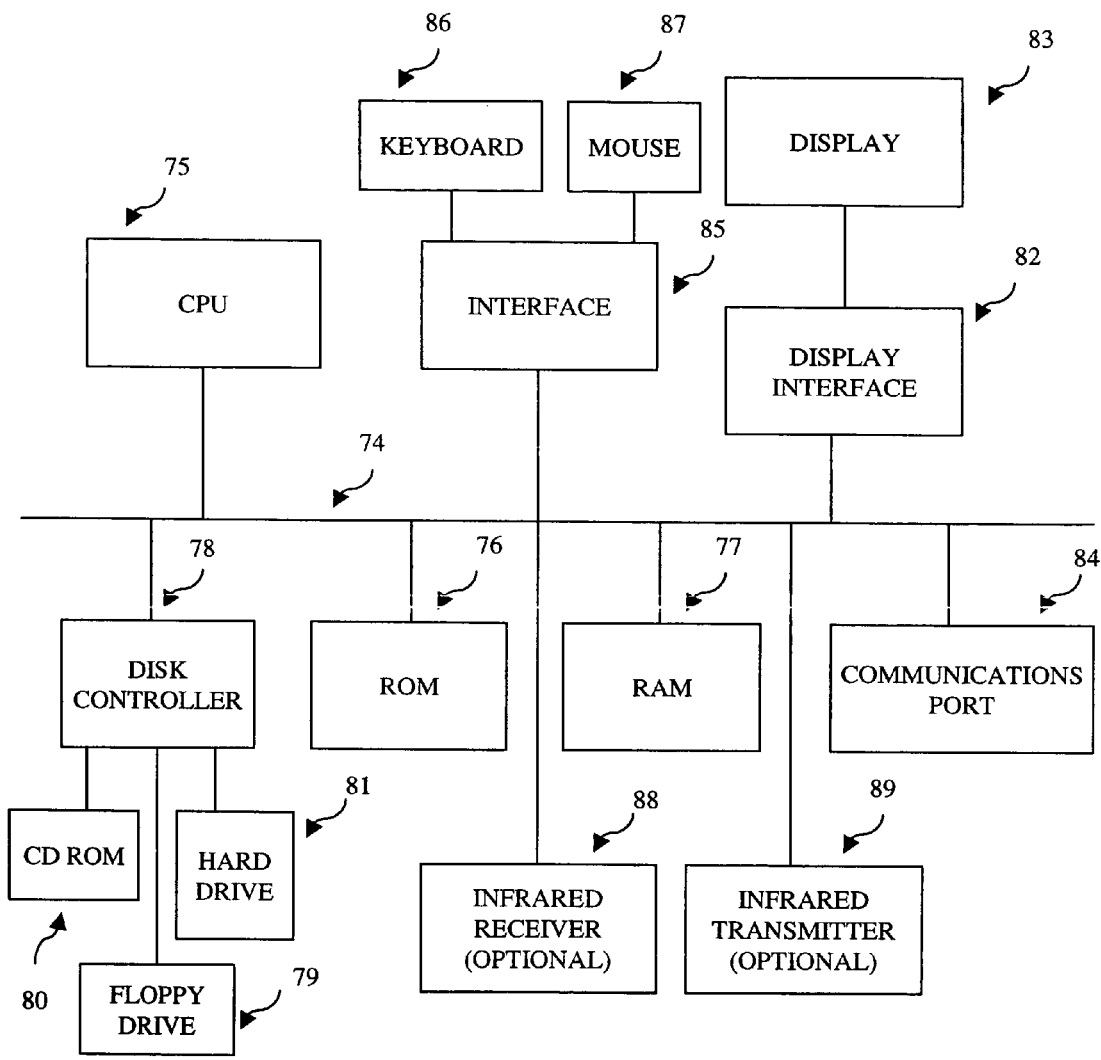
FIG. 7 is a block diagram illustrating the internal hardware of FIG. 6.

FIG. 7 illustrates a block diagram of the internal hardware of the computer of FIG. 6. CPU 75 is the central processing unit of the system, performing calculations and logic operations required to execute a program. Read only memory (ROM) 76 and random access memory (RAM) 77 constitute the main memory of the computer. Disk controller 78 interfaces one or more disk drives to the system bus 74. These disk drives may be floppy disk drives such as 79, or CD ROM or DVD (digital video/versatile disk) drives, as at 80, or internal or external hard drives 81. As previously indicated these various disk drives and disk controllers are optional devices.

A display interface 82 permits information from bus 74 to be displayed on the display 83. Again, as indicated, the display 83 is an optional accessory for a central or remote computer in the communication network, as are infrared receiver 88 and transmitter 89. Communication with external devices occurs using communications port 84.

In addition to the standard components of the computer, the computer may also include an interface 85, which allows for data input through the keyboard 86 or pointing device, such as a mouse 87.

As an example, the process control system may incorporate a factory automation system with a general purpose computer, or a specially programmed special purpose computer. It may also be implemented to include a distributed computer system rather than as a single computer; some of the distributed system might include embedded systems. Further, the programming may be distributed among processing devices and metrology tools and/or other parts of the process control system. Similarly, the processing could be controlled by a software program on one or more computer systems or processors, or could be partially or wholly implemented in hardware. Moreover, the factory automation system may communicate directly or indirectly with the relevant metrology tool(s), processing device(s), and metrology system(s); or the metrology tool(s), processing device(s) and metrology system(s) may communicate directly or indirectly with each other and the factory automation system.

As another example, the system may be implemented on a web based computer, e.g., via an interface to collect and/or analyze data from many sources. It may be connected over a network, e.g., the Internet, an Intranet, or even on a single computer system. Moreover, portions of the system may be distributed (or not) over one or more computers, and some functions may be distributed to other hardware, such as tools, and still remain within the scope of this invention. The user may interact with the system via e.g., a personal computer or over PDA, e.g., the Internet, an intranet, etc. Either of these may be implemented as a distributed computer system rather than a single computer. Similarly, a communications link may be a dedicated link, a modem over a POTS line, and/or any other method of communicating between computers and/or users. Moreover, the processing could be controlled by a software program on one or more computer systems or processors, or could even be partially or wholly implemented in hardware.

User interfaces may be developed in connection with an HTML display format. It is possible to utilize alternative technology for displaying information, obtaining user instructions and for providing user interfaces.

The invention has been discussed in connection with particular examples. However, the principles apply equally to other examples and/or realizations. For example, particular semi-conductor processes such as chemical vapor deposition were discussed, although the invention may be performed in connection with other semi-conductor processes. In addition, one or more embodiments of the invention are useful with systems not related to semi-conductor, in which processing adjustments are made and processing may benefit from distinguishing white noise. Such systems include, by way of example, systems for producing optical lenses, systems for controlling room temperature, and/or systems for controlling water temperature.

The system used in connection with the invention may rely on the integration of various components including, as appropriate and/or if desired, hardware and software servers, database engines, and/or other process control components. The configuration may be, alternatively, network-based and may, if desired, use the Internet as an interface with the user.

The system according to one or more embodiments of the invention may store collected information in a database. An appropriate database may be on a standard server, for example, a small Sun™ Sparc™ or other remote location. The information may, for example, optionally be stored on a platform that may, for example, be UNIX-based. The various databases maybe in, for example, a UNIX format, but other standard data formats may be used.

Although the process control system is illustrated as having a single computer, the system according to one or more embodiments of the invention is optionally suitably equipped with a multitude or combination of processors or storage devices. For example, the computer may be replaced by, or combined with, any suitable processing system operative in accordance with the principles of embodiments of the present invention, including sophisticated calculators, hand held, laptop/notebook, mini, mainframe and super computers, one or more embedded processors, as well as processing system network combinations of the same. Further, portions of the system may be provided in any appropriate electronic format, including, for example, provided over a communication line as electronic signals, provided on floppy disk, provided on CD Rom, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an interpretive environment such as Java and transported to multiple destinations to various users.

The invention may include a process and/or steps. Where steps are indicated, they may be performed in any order, unless expressly and necessarily limited to a particular order. Steps that are not so limited may be performed in any order.

While this invention has been described in conjunction with the specific embodiments outlined above, many alternatives, modifications and variations will be apparent to those skilled in the art. Accordingly, the preferred embodiments of the invention as set forth are intended to be illustrative and not limiting. Various changes may be made without departing from the spirit and scope of the invention as defined in the application. The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the application.

What is claimed is:

1. A system, implemented on at least one computer, for compensating for a variance between a measured characteristic of at least one product produced by a process and a target result of the characteristic, the system comprising:
    (a) means for receiving an observed value for at least one product, and receiving a target value for the at least one product;
    (b) means for determining a variance between the observed value of at least one product and the target value of the at least one product;
    (c) means for determining a first portion of the variance caused by white noise;
    (d) means for determining a second portion of the variance caused by a systematic component; and
    (e) means, in the at least one computer, for using the determined first and/or second portions to adjust the process.

2. The system of claim 1, wherein the at least one product is a semi-conductor wafer, and the process is an automated semiconductor manufacturing process.

3. The system of claim 1, wherein the target value is derived from a specification, the specification being selected from at least one of a predetermined specification, and a real-time calculation taken from a plurality of prior observed values of products.

4. The system of claim 1, wherein the process has at least one control parameter capable of being controlled, further comprising means for controlling the at least one control parameter during the process based on the second portion of the variance.

5. The system of claim 4, further comprising means for determining the observed value for a plurality of products including the at least one product; determining at least the second portion of the variance for the plurality of products and utilizing the second portion of the variance for the plurality of products as a threshold; and determining whether or not to control the plurality of products when the observed value is outside the threshold.

6. The system of claim 4, wherein the process includes at least one device on which the plurality of products including the at least one product is processed, the observed value being relative to the at least one device, the at least one device including the at least one control parameter, wherein controlling the at least one control parameter includes affecting the at least one device.

7. The system of claim 4, wherein the process includes a plurality of devices including a first device and a second device on which the plurality of products including the at least one product are processed, the observed value being relative to the first device, the second device including the at least one control parameter, wherein controlling the at least one control parameter includes affecting at least the second device.

8. The system of claim 1, wherein the first portion and second portion are determined over a plurality of products.

9. The system of claim 1, wherein the first portion and second portion of the variance are calculated using an autoregressive stochastic sequence.

10. The system of claim 1, wherein the first portion and second portion of the variance are substantially determined by:

$$\delta_x = y/(1+z)$$

where
    $\delta_x$ = a value representing the variation that a system can control
    y = calculated value from previous values
    z = estimated gain adjustment.

11. The system of claim 1, wherein the target value is derived from a specification, the specification being selected from at least one of a predetermined specification, and a real-time calculation taken from a plurality of prior observed values of products.

12. The system of claim 1, wherein the white noise includes at least one of random variance, normal deviation, and an ambient fluctuation.

13. A computer-implemented method for compensating for a variance between a measured characteristic of at least one product produced by a process and a target result of the characteristic, comprising the steps of:
    (a) receiving an observed value for at least one product, and receiving a target value for the at least one product;
    (b) determining a variance between the observed value of at least one product and the target value of the at least one product;
    (c) determining a first portion of the variance caused by white noise;
    (d) determining a second portion of the variance caused by a systematic component; and
    (e) using the determined first and/or second portions to adjust the process.

14. The method of claim 13, wherein the at least one product is a semiconductor wafer, and the process is an automated semiconductor manufacturing process.

15. The method of claim 13, wherein the target value is derived from a specification, the specification being selected from at least one of a predetermined specification, and a real-time calculation taken from a plurality of prior observed values of products.

16. The method of claim 13, wherein the process has at least one control parameter capable of being controlled, further comprising the step of controlling the at least one control parameter during the process based on the second portion of the variance.

17. The method of claim 16, further comprising the steps of determining the observed value for a plurality of products including the at least one product; determining at least the second portion of the variance for the plurality of products and utilizing the second portion of the variance for the plurality of products as a threshold; and determining whether or not to perform the controlling step for the plurality of products when the observed value is outside the threshold.

18. The method of claim 16, wherein the process includes at least one device on which the plurality of products including the at least one product is processed, the observed value being relative to the at least one device, the at least one device including the at least one control parameter, wherein the step of controlling the at least one control parameter includes affecting the at least one device.

19. The method of claim 16, wherein the process includes a plurality of devices including a first device and a second device on which the plurality of products including the at least one product are processed, the observed value being relative to the first device, the second device including the at least one control parameter, wherein the step of controlling the at least one control parameter includes affecting at least the second device.

20. The method of claim 3, wherein the first portion and second portion are determined over a plurality of products.

21. The method of claim 13, wherein the first portion and second portion of the variance are calculated using an autoregressive stochastic sequence.

22. The method of claim 13, wherein the first portion and second portion of the variance are substantially determined by:

$$\delta_x = y/(1+z)$$

where
 $\delta_x$=a value representing the variation that a system can control
 y=calculated value from previous values
 z=estimated gain adjustment.

23. The method of claim 13, wherein the white noise includes at least one of random variance, normal deviation, and an ambient fluctuation.

24. A computer program product for use in compensating for a variance between a measured characteristic of at least one product produced by a process and a target result of the characteristic by differentiating a white noise component of the variance from a systematic component of the variance, the computer program product comprising:
 (a) at least one computer readable medium, readable by the manufacturing process;
 (b) instructions, provided on the at least one computer readable medium, for receiving an observed value for at least one product, and receiving a target value for the at least one product;
 (c) instructions, provided on the at least one computer readable medium, for determining a variance between the observed value of at least one product and the target value of the at least one product;
 (d) instructions, provided on the at least one computer readable medium, for determining a first portion of the variance caused by white noise; and
 (e) instructions, provided on the at least one computer readable medium, for determining a second portion of the variance caused by a systematic component; and
 (f) instructions, provided on the at least one computer readable medium, for using the determined first and/or second portions to adjust the process.

25. The computer program product of claim 24, wherein the at least one product includes a semi-conductor wafer, and the computer readable medium is readable by a process including an automated semiconductor manufacturing process.

26. The computer program product of claim 24, wherein the target value is derived from a specification, the specification being selected from at least one of a predetermined specification, and a real-time calculation taken from a plurality of prior observed values of products.

27. The computer program product of claim 24, wherein the process has at least one control parameter capable of being controlled, further comprising instructions, provided on the computer readable medium, for controlling the at least one control parameter during the process based on the second portion of the variance.

28. The computer program product of claim 27, further comprising instructions, on the computer readable medium, for determining the observed value for the plurality of products including the at least one product; determining at least the second portion of the variance for the plurality of products and utilizing the second portion of the variance for the plurality of products as a threshold; and determining whether or not to execute the controlling instructions for the at least one product when the observed value is outside the threshold.

29. The computer program product of claim 28, wherein the process includes at least one device on which the plurality of products including the at least one product is processed, the observed value being relative to the at least one device, the at least one device including the at least one control parameter, wherein the instructions for controlling the at least one control parameter includes affecting the at least one device.

30. The computer program product of claim 28, wherein the process includes a plurality of devices including a first device and a second device on which the plurality of products including the at least one product are processed, the observed value being relative to the first device, the second device including the at least one control parameter, wherein the instructions for controlling the at least one control parameter includes affecting at least the second device.

31. The computer program product of claim 24, wherein the first portion and the second portion are determined over a plurality of products.

32. The computer program product of claim 24, wherein the first portion and second portion of the variance are calculated using an autoregressive stochastic sequence.

33. The computer program product of claim 24, wherein the first portion and second portion of the variance are substantially determined by:

$$\delta_x = y/(1+z)$$

where
 $\delta_x$=a value representing the variation that a system can control
 y=calculated value from previous values
 z=estimated gain adjustment.

34. The computer program product of claim 24, wherein the white noise includes at least one of random variance, normal deviation, and an ambient fluctuation.

* * * * *